(12) United States Patent
Ohart et al.

(10) Patent No.: US 10,502,482 B2
(45) Date of Patent: Dec. 10, 2019

(54) METHOD FOR THE PRODUCTION OF LIQUEFIED NATURAL GAS

(71) Applicant: DRESSER-RAND COMPANY, Olean, NY (US)

(72) Inventors: Daniel L. Ohart, Waverly, NY (US); Gregory W. Yonker, Lawrenceville, PA (US)

(73) Assignee: DRESSER-RAND COMPANY, Olean, NY (US)

( * ) Notice: Subject to any disclaimer, the term of this patent is extended or adjusted under 35 U.S.C. 154(b) by 34 days.

(21) Appl. No.: 15/465,634

(22) Filed: Mar. 22, 2017

(65) Prior Publication Data
US 2017/0191749 A1 Jul. 6, 2017

Related U.S. Application Data

(62) Division of application No. 14/566,119, filed on Dec. 10, 2014, now Pat. No. 9,696,086.

(Continued)

(51) Int. Cl.
| | | |
|---|---|---|
| *F25J 1/00* | (2006.01) | |
| *F25J 1/02* | (2006.01) | |
| *H02K 7/18* | (2006.01) | |

(52) U.S. Cl.
CPC ......... *F25J 1/0022* (2013.01); *F25J 1/0037* (2013.01); *F25J 1/0045* (2013.01); *F25J 1/0052* (2013.01);
(Continued)

(58) Field of Classification Search
None
See application file for complete search history.

(56) References Cited

U.S. PATENT DOCUMENTS

| | | | | |
|---|---|---|---|---|
| 5,950,453 A | * | 9/1999 | Bowen | B23K 9/173 62/612 |
| 5,956,971 A | * | 9/1999 | Cole | F25J 1/0202 62/623 |

(Continued)

FOREIGN PATENT DOCUMENTS

| | | |
|---|---|---|
| CN | 85101713 A | 1/1987 |
| CN | 1993593 A | 7/2007 |

(Continued)

OTHER PUBLICATIONS

PCT International Search Report and Written Opinion dated Mar. 26, 2015 corresponding to PCT Application PCT/US2014/069727 filed Dec. 11, 2014.

*Primary Examiner* — Amber R Orlando
*Assistant Examiner* — Brit E. Anbacht

(57) ABSTRACT

A system and method for producing liquefied natural gas are provided. The method may include compressing a process stream containing natural gas in a compression assembly to produce a compressed process stream. The method may also include removing non-hydrocarbons from the compressed process stream in a separator, and cooling the compressed process stream with a cooling assembly to thereby produce a cooled, compressed process stream containing natural gas in a supercritical state. The method may further include expanding a first portion and a second portion of the natural gas from the cooled, compressed process stream in a first expansion element and a second expansion element to generate a first refrigeration stream and a second refrigeration stream, respectively. The method may further include cooling the natural gas in the cooled, compressed process stream to a supercritical state with the first and second refrigeration streams to thereby produce the liquefied natural gas.

13 Claims, 3 Drawing Sheets

Related U.S. Application Data

(60) Provisional application No. 61/932,668, filed on Jan. 28, 2014.

(52) U.S. Cl.
CPC ........... *F25J 1/0208* (2013.01); *F25J 1/0227* (2013.01); *F25J 1/0242* (2013.01); *F25J 1/0284* (2013.01); *F25J 1/0288* (2013.01); *F25J 1/0292* (2013.01); *H02K 7/1815* (2013.01); *F25J 2205/60* (2013.01); *F25J 2220/66* (2013.01); *F25J 2270/906* (2013.01)

(56) References Cited

U.S. PATENT DOCUMENTS

| | | | | |
|---|---|---|---|---|
| 6,016,665 | A * | 1/2000 | Cole | ............... B23K 9/173 |
| | | | | 62/612 |
| 6,023,942 | A * | 2/2000 | Thomas | ............... B23K 9/173 |
| | | | | 62/613 |
| 6,158,240 | A | 12/2000 | Low et al. | |
| 6,378,330 | B1 * | 4/2002 | Minta | ............... F25J 1/0035 |
| | | | | 62/613 |
| 6,751,985 | B2 * | 6/2004 | Kimble | ............... F25J 1/0022 |
| | | | | 62/613 |
| 8,020,406 | B2 | 9/2011 | Vandor et al. | |
| 10,006,695 | B2 | 6/2018 | Miller et al. | |
| 2004/0083888 | A1 | 5/2004 | Qualls | |
| 2006/0213223 | A1 | 9/2006 | Wilding | |
| 2007/0107465 | A1 | 5/2007 | Turner | |
| 2008/0141672 | A1 | 6/2008 | Shah | |
| 2009/0113928 | A1 | 5/2009 | Vandor | |
| 2010/0122551 | A1 * | 5/2010 | Roberts | ............... F25J 1/0022 |
| | | | | 62/613 |
| 2010/0275644 | A1 | 11/2010 | Koganezawa et al. | |
| 2012/0036888 | A1 | 2/2012 | Vandor | |
| 2015/0211787 | A1 * | 7/2015 | Ohart | ............... F25J 1/0022 |
| | | | | 62/611 |
| 2015/0219392 | A1 * | 8/2015 | Millar | ............... F25J 1/0022 |
| | | | | 62/613 |
| 2015/0276307 | A1 * | 10/2015 | Ohart | ............... F25J 1/0037 |
| | | | | 62/613 |
| 2017/0010042 | A1 * | 1/2017 | Kerth | ............... F25J 1/0022 |
| 2017/0191749 | A1 * | 7/2017 | Ohart | ............... F25J 1/0022 |
| 2017/0268818 | A1 * | 9/2017 | Ohart | ............... F25J 1/0022 |
| 2018/0148138 | A1 * | 5/2018 | Shin | ............... F02M 21/0287 |

FOREIGN PATENT DOCUMENTS

| | | |
|---|---|---|
| CN | 101023308 A | 7/2007 |
| CN | 100395497 C | 6/2008 |
| CN | 202501709 U | 10/2012 |
| EP | 2562501 A2 | 2/2013 |
| WO | 2012172281 A2 | 12/2012 |

\* cited by examiner

METHOD FOR THE PRODUCTION OF LIQUEFIED NATURAL GAS

CROSS REFERENCE TO RELATED APPLICATIONS

The present application is a divisional of co-pending U.S. patent application Ser. No. 14/566,119, filed on Dec. 10, 2014, which claims the benefit of U.S. Provisional Patent Application Ser. No. 61/932,668, filed on Jan. 28, 2014. The aforementioned patent applications are hereby incorporated by reference in their entirety into the present application to the extent consistent with the present application.

BACKGROUND

The combustion of conventional fuels, such as gasoline and diesel, has proven to be essential in a myriad of industrial processes. The combustion of gasoline and diesel, however, may often be accompanied by various drawbacks including increased production costs and increased carbon emissions. In view of the foregoing, recent efforts have focused on alternative fuels with decreased carbon emissions, such as natural gas, to combat the drawbacks of combusting conventional fuels. In addition to providing a "cleaner" alternative fuel with decreased carbon emissions, combusting natural gas may also be relatively safer than combusting conventional fuels. For example, the relatively low density of natural gas allows it to safely and readily dissipate to the atmosphere in the event of a leak. In contrast, conventional fuels (e.g., gasoline and diesel) with a relatively high density tend to settle or accumulate in the event of a leak, which may present a hazardous and/or fatal working environment for nearby operators.

While the utilization of natural gas may address some of the drawbacks associated with conventional fuels, the storage and transport of natural gas in sufficient quantities may prevent it from being viewed as a viable alternative to conventional fuels. For example, the storage and/or transport of natural gas in appreciable quantities may be cost-prohibitive and/or impracticable due to its relatively low density. Accordingly, natural gas is routinely converted into liquefied natural gas (LNG) at an LNG plant and transported from the LNG plant to the end user or customer by tanker trucks. The availability of LNG, however, may often be limited by the proximity of the customer to the LNG plant. For example, customers that are remotely located from the LNG plant may often rely on deliveries from the tanker trucks, which increase the cost of utilizing LNG. Additionally, remotely located customers may often be required to maintain larger, cost-prohibitive storage tanks to reduce the frequency of the deliveries and/or their dependence on the tanker trucks. In lieu of LNG, remotely located customers may opt to utilize local natural gas pipelines to produce compressed natural gas (CNG) on-site. CNG, similar to natural gas, has a lower relative density than LNG; and thus, the storage of CNG in appreciable quantities may also be cost-prohibitive and/or impracticable.

What is needed, then, is a system and method for producing LNG from natural gas pipelines and stranded wells.

SUMMARY

Embodiments of the disclosure may provide a method for producing liquefied natural gas. The method may include compressing a process stream containing natural gas from a natural gas source to produce a compressed process stream. The process stream may be compressed to provide the compressed process stream in a compression assembly fluidly coupled with the natural gas source. The method may also include removing one or more non-hydrocarbons from the compressed process stream in a separator fluidly coupled with the compression assembly. The method may further include cooling the compressed process stream with a cooling assembly fluidly coupled with the compression assembly to thereby produce a cooled, compressed process stream containing the natural gas in a supercritical state. The method may also include expanding a first portion of the natural gas in the cooled, compressed process stream in a first expansion element to generate a first refrigeration stream, and expanding a second portion of the natural gas in the cooled, compressed process stream in a second expansion element to generate a second refrigeration stream. The method may also include cooling at least a portion of the natural gas in the cooled, compressed process stream to a subcritical state with the first refrigeration stream and the second refrigeration stream to thereby produce the liquefied natural gas.

Embodiments of the disclosure may further provide another method for producing liquefied natural gas. The method may include compressing natural gas from a natural gas source in a compression assembly fluidly coupled with the natural gas source. The method may also include removing water and carbon dioxide from the natural gas in a separator fluidly coupled with the compression assembly. The method may further include cooling the natural gas to supercritical natural gas with a mechanical chiller configured to receive and be driven by electrical energy. The method may also include expanding a first portion of the supercritical natural gas in a first expansion element to generate a first refrigeration stream, and expanding a second portion of the supercritical natural gas in a second expansion element to generate a second refrigeration stream. The method may further include cooling the remaining supercritical natural gas to subcritical natural gas with the first refrigeration stream and the second refrigeration stream to thereby produce the liquefied natural gas.

Embodiments of the disclosure may further provide a system for producing liquefied natural gas. The system may include a compressor fluidly coupled with a natural gas source. The compressor may be configured to compress a process stream containing natural gas from the natural gas source to a compressed process stream. A separator may be fluidly coupled with the compressor and configured to receive the compressed process stream and at least partially separate water and carbon dioxide from the natural gas in the compressed process stream. The system may also include a mechanical chiller in thermal communication with the compressor. The mechanical chiller may be configured to cool the natural gas in the compressed process stream to supercritical natural gas. A turbo-expander may be fluidly coupled with the compressor and configured to expand a first portion of the supercritical natural gas to generate a first refrigeration stream. An expansion valve may be fluidly coupled with the compressor and configured to expand a second portion of the supercritical natural gas to generate a second refrigeration stream. The system may further include a first heat exchanger fluidly coupled with the turbo-expander, and a second heat exchanger fluidly coupled with the expansion valve. The first heat exchanger may be configured to cool the supercritical natural gas with the first refrigeration stream, and the second heat exchanger may be configured to cool the supercritical natural gas with the second refrigeration stream.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
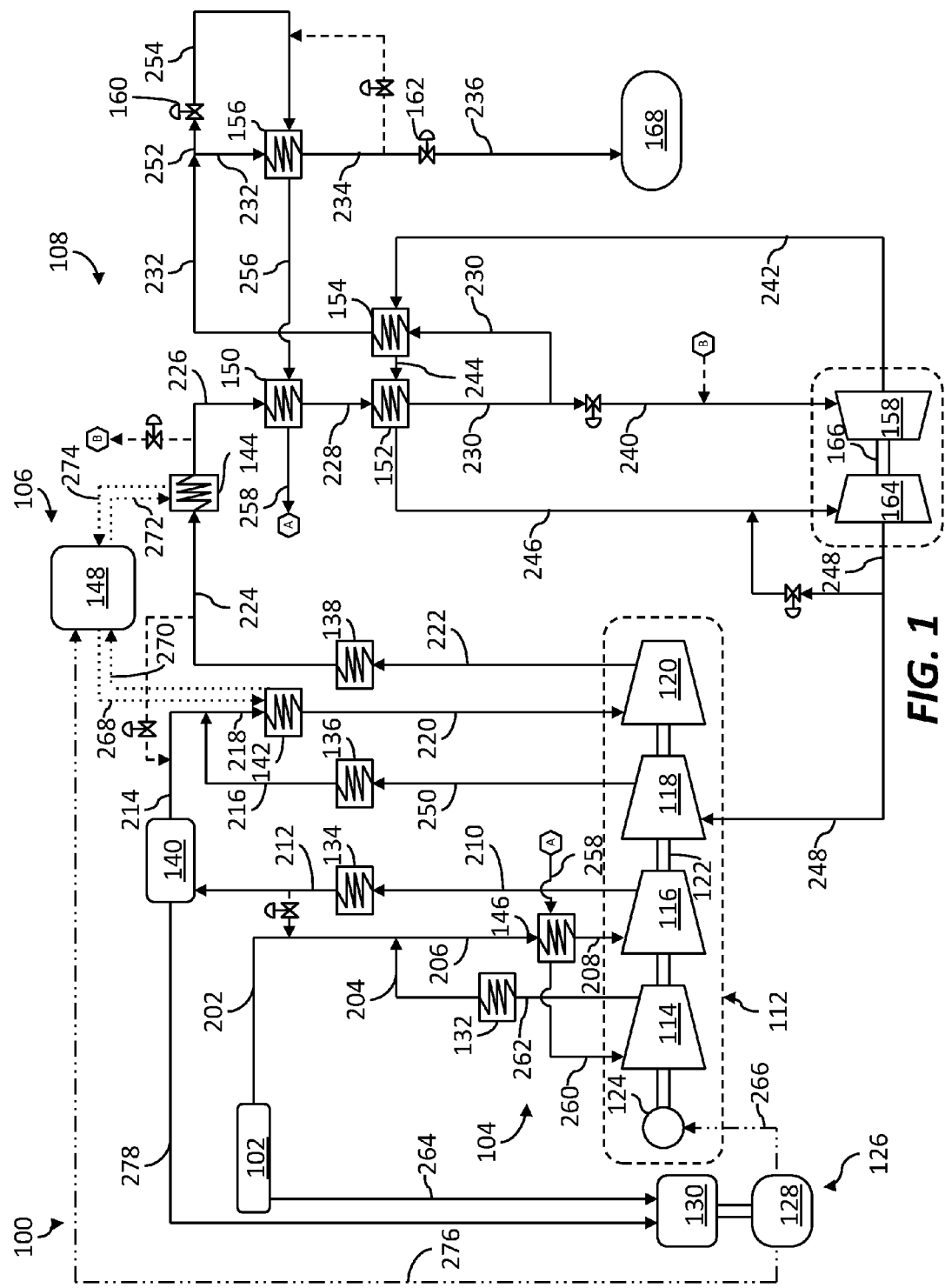
FIG. 1 illustrates a process flow diagram of an exemplary system for producing liquefied natural gas (LNG) from a natural gas source, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a process flow diagram of an exemplary system 100 for producing compressed natural gas (CNG) and/or liquefied natural gas (LNG) from a natural gas source 102, according to one or more embodiments. In least one embodiment, the system 100 may include a compression assembly 104, a cooling assembly 106, and a liquefaction assembly 108 coupled with and/or in thermal communication with one another. The system 100 may be configured to circulate a process stream containing natural gas from the natural gas source 102 to one or more portions or assemblies thereof. For example, the system 100 may be fluidly coupled with the natural gas source 102 via line 202 and configured to circulate the process stream containing the natural gas from the natural gas source 102 to the compression assembly 104, the cooling assembly 106, and/or the liquefaction assembly 108.

In one or more portions or assemblies of the system 100, the natural gas in the process stream may be in a liquid phase, a gaseous phase, a fluid phase, a subcritical state, a supercritical state, or any other phases or states, or any combination thereof. For example, as further described herein, the compression assembly 104 and the cooling assembly 106 may at least partially compress and cool the natural gas in the process stream from the gaseous phase to the supercritical state (e.g., CNG). In another example, as further described herein, the liquefaction assembly 108 may further cool the natural gas in the process stream from the supercritical state (e.g., CNG) to the subcritical state (e.g., LNG).

In at least one embodiment, the natural gas source 102 may be or include a natural gas pipeline, a stranded natural gas wellhead, or the like, or any combination thereof. For example, the natural gas source 102 may be low-pressure natural gas pipeline. The natural gas from the natural gas source 102 may include one or more hydrocarbons. For example, the natural gas may include methane, ethane, propane, butanes, pentanes, or the like, or any combination thereof. In at least one embodiment, methane may be a major component of the natural gas. For example, the concentration of methane in the natural gas from the natural gas source 102 may be greater than about 80%, greater than about 85%, greater than about 90%, or greater than about 95%. In at least one embodiment, the natural gas from the natural gas source 102 may be or include a mixture of one or more hydrocarbons (e.g., methane) and one or more non-hydrocarbons. Illustrative non-hydrocarbons may include, but are not limited to, water, carbon dioxide ($CO_2$), hydrogen sulfide, helium, nitrogen, or the like, or any combination thereof.

In at least one embodiment, the compression assembly 104 may include one or more compressors (one is shown 112) fluidly coupled with the natural gas source 102 and configured to compress and/or pressurize the natural gas from the natural gas source 102. For example, as illustrated in FIG. 1, the compressor 112 may be fluidly coupled with the natural gas source 102 via lines 202, 206, and 208. Illustrative compressors 112 may include, but are not limited to, supersonic compressors, centrifugal compressors, axial flow compressors, reciprocating compressors, rotating screw compressors, rotary vane compressors, scroll compressors, diaphragm compressors, or the like, or any combination thereof. In at least one embodiment, the compressor 112 may include one or more compressor stages (four are shown 114, 116, 118, 120). For example, as illustrated in FIG. 1, the compressor 112 may include a first compressor stage 114, a second compressor stage 116, a third compressor stage 118, and a fourth compressor stage 120 coupled with one another via a driveshaft 122 of the compressor 112.

In at least one embodiment, the compression assembly 104 may include one or more drivers or motors (one is shown 124) coupled with and configured to drive the compressor 112 and/or one or more components thereof. For example, as illustrated in FIG. 1, the driver 124 may be coupled with and configured to drive the compressor stages 114, 116, 118, 120 of the compressor 112 via the driveshaft 122. Illustrative drivers 124 may include, but are not limited to, electric motors, turbines, and/or any other devices capable of driving the compressor 112 and/or the compressor stages 114, 116, 118, 120 thereof. In an exemplary embodiment, illustrated in FIG. 1, the driver 124 may be an electric motor configured to receive and be driven by electrical energy.

In at least one embodiment, the system 100 may include a power generation system 126 configured to generate electrical energy to drive one or more components or assemblies of the system 100. For example, the power generation system 126 may be configured to generate electrical energy to drive the electric motor 124 of the compression assembly 104. In at least one embodiment, the power generation system 126 may include an internal combustion engine 130 and a generator 128 operably coupled with the internal combustion engine 130. As illustrated in FIG. 1, the internal combustion engine 130 may be fluidly coupled with the natural gas source 102 via line 264 and configured to receive and combust at least a portion of the natural gas from the natural gas source 102 to generate mechanical energy. The generator 128 may be configured to convert the mechanical energy from the internal combustion engine 130 to electrical energy and deliver the electrical energy to the electric motor 124 via line 266 to thereby drive the electric motor 124 and the compressor 112.

In at least one embodiment, the compression assembly 104 may include one or more heat exchangers or coolers (four are shown 132, 134, 136, 138) configured to absorb or remove heat from the process stream flowing therethrough. As illustrated in FIG. 1, the coolers 132, 134, 136, 138 may be fluidly coupled with the compressor stages 114, 116, 118, 120 and configured to remove heat generated in the compressor stages 114, 116, 118, 120. For example, compressing the process stream in the compressor stages 114, 116, 118, 120 may generate heat (e.g., heat of compression) in the process stream, and the coolers 132, 134, 136, 138 may be configured to remove the heat of compression from the process stream and/or the natural gas contained therein.

In at least one embodiment, each of the coolers 132, 134, 136, 138 may be fluidly coupled with and disposed downstream from the respective compressor stages 114, 116, 118, 120 of the compressor 112. For example, a first cooler 132 may be fluidly coupled with and disposed downstream from the first compressor stage 114 via line 262, a second cooler 134 may be fluidly coupled with and disposed downstream from the second compressor stage 116 via line 210, a third cooler 136 may be fluidly coupled with and disposed downstream from the third compressor stage 118 via line 250, and a fourth cooler 138 may be fluidly coupled with and disposed downstream from the fourth compressor stage 120 via line 222. As illustrated in FIG. 1, the first cooler 132 may also be fluidly coupled with lines 202 and 206 via line 204.

In at least one embodiment, a heat transfer medium may flow through the coolers 132, 134, 136, 138 to absorb the heat in the process stream flowing therethrough. Accordingly, the heat transfer medium may have a higher temperature when it exits the coolers 132, 134, 136, 138, and the process stream may have a lower temperature when it exits the coolers 132, 134, 136, 138. The heat transfer medium may be or include water, steam, a refrigerant, a process gas, such as carbon dioxide, propane, or natural gas, or the like, or any combination thereof. In an exemplary embodiment, the heat transfer medium may be or include a refrigerant from the cooling assembly 106. In at least one embodiment, the heat transfer medium from the coolers 132, 134, 136, 138 may provide supplemental heating to one or more systems and/or assemblies of the system 100. For example, the heat transfer medium containing the heat absorbed from the coolers 132, 134, 136, 138 may provide supplemental heating to a heat recovery unit (HRU) (not shown).

As previously discussed, the natural gas from the natural gas source 102 may be or include a mixture of one or more hydrocarbons (e.g., methane, ethane, etc.) and one or more non-hydrocarbons (e.g., water, $CO_2$, hydrogen sulfide, etc.). In at least one embodiment, the system 100 may include a separator 140 fluidly coupled with the compression assembly 104 and configured to at least partially separate or remove one or more of the non-hydrocarbons from the natural gas contained in the process stream. For example, as illustrated in FIG. 1, the separator 140 may be fluidly coupled with and disposed downstream from the second compressor stage 116 and the second cooler 134 of the compression assembly 104 via lines 210 and 212. In at least one embodiment, the separator 140 may be configured to remove water and/or $CO_2$ from the natural gas in the process stream to increase the concentration of the hydrocarbons in the process stream and/or prevent the natural gas in the process stream from subsequently crystallizing (e.g., freezing) in one or more portions and/or downstream processes of the system 100. For example, in one or more portions and/or downstream processes of the system 100, the process stream may be cooled to or below a freezing point of one or more of the non-hydrocarbons (e.g., water and/or $CO_2$). Accordingly, removing water and/or $CO_2$ from the natural gas contained in the process stream may prevent the subsequent crystallization of the process stream in the system 100.

In at least one embodiment, the separator 140 may include or contain one or more adsorbents configured to separate the non-hydrocarbons from the natural gas in the process stream. The adsorbents may include, but are not limited to, one or more molecular sieves, zeolites, metal-organic frameworks, or the like, or any combination thereof. In at least one embodiment, the adsorbent, such as the molecular sieve, may be activated at varying temperatures and/or pressures. The adsorbent may have an adsorptive capacity determined by an amount of an adsorbate or the non-hydrocarbons (e.g., $CO_2$, water, etc.) separated by the adsorbent under predetermined conditions (e.g., temperature and/or pressure).

In at least one embodiment, the separator 140 and/or the adsorbent contained therein may be configured to separate the non-hydrocarbons from the process stream at a predetermined pressure. For example, the separator 140 and/or the adsorbent may be configured to separate the non-hydrocarbons (e.g., $CO_2$ and/or water) at a pressure from a low of about 600 kPa, about 650 kPa, about 700 kPa, about 750 kPa, about 800 kPa, about 850 kPa, about 900 kPa, about 950 kPa, about 975 kPa, or about 1,000 kPa to a high of about 1,025 kPa, about 1,050 kPa, about 1,100 kPa, about 1,150 kPa, about 1,200 kPa, about 1,250 kPa, about 1,300 kPa, about 1,350 kPa, about 1,400 kPa, about 1,500 kPa, or greater. In another example, the separator 140 and/or the adsorbent may be configured to separate the non-hydrocarbons (e.g., $CO_2$ and/or water) at a pressure from about 600 kPa to about 1,500 kPa, about 650 kPa to about 1,400 kPa, about 700 kPa to about 1,350 kPa, about 750 kPa to about 1,300 kPa, about 800 kPa to about 1,250 kPa, about 850 kPa to about 1,200 kPa, about 900 kPa to about 1,150 kPa, about 950 kPa to about 1,100 kPa, about 975 kPa to about 1,050 kPa, or about 1,000 kPa to about 1,025 kPa. In another example, the separator 140 and/or the adsorbent may be configured to separate the non-hydrocarbons (e.g., $CO_2$ and/or water) at a pressure greater than about 900 kPa, greater than about 1,000 kPa, greater than about 1,005 kPa, greater than about 1,010 kPa, greater than about 1,015 kPa, greater than about 1,020 kPa, greater than about 1,025 kPa, greater than about 1,030 kPa, greater than about 1,035 kPa, greater than about 1,040 kPa, greater than about 1,045 kPa, greater than about 1,050 kPa, greater than about 1,100 kPa, greater than about 1,150 kPa, greater than about 1,200 kPa, greater than about 1,250 kPa, greater than about 1,300 kPa, or greater than about 1,400 kPa.

In at least one embodiment, the separator 140 and/or the adsorbent contained therein may be configured to separate the non-hydrocarbons from the process stream at a predetermined temperature. For example, the separator 140 and/or the adsorbent may be configured to separate the non-hydrocarbons (e.g., $CO_2$ and/or water) at a temperature from a low of about 40° C., about 50° C., about 55° C., or about 60° C. to a high of about 70° C., about 75° C., about 80° C., about 90° C., or greater. In another example, the separator 140 and/or the adsorbent may be configured to separate the non-hydrocarbons (e.g., $CO_2$ and/or water) at a temperature from about 40° C. to about 90° C., about 50° C. to about 80° C., about 55° C. to about 75° C., or about 60° C. to about 70° C. In another example, the separator 140 and/or the adsorbent may be configured to separate the non-hydrocarbons (e.g., $CO_2$ and/or water) at a temperature greater than about 50° C., greater than about 55° C., greater than about 60° C., greater than about 65° C., or greater than about 70° C. In another example, the separator 140 and/or the adsorbent may be configured to separate the non-hydrocarbons (e.g., $CO_2$ and/or water) at a temperature less than about 100° C., less than about 95° C., less than about 90° C., less than about 85° C., less than about 80° C., less than about 75° C., or less than about 70° C. In an exemplary embodiment, the separator 140 and/or the adsorbent may be configured to separate the non-hydrocarbons (e.g., $CO_2$ and/or water) at a temperature of about 65.5° C.

In at least one embodiment, the non-hydrocarbons (e.g., $CO_2$ and/or water) may be desorbed from the adsorbent by directing or flowing a purge gas through the separator 140 to thereby regenerate the separator 140 and/or the adsorbent. As the purge gas flows through the separator 140, the non-hydrocarbons (e.g., $CO_2$ and/or water) may desorb from the adsorbent (e.g., molecular sieve) and combine with the purge gas to provide a regeneration gas including a mixture of the purge gas and the non-hydrocarbons. In an exemplary embodiment, the separator 140 and/or the adsorbent contained therein may be configured to adsorb $CO_2$ and/or water from the natural gas in the process stream. Accordingly, directing the purge gas through the separator 140 may provide a regeneration gas including a mixture of the purge gas, $CO_2$, and/or water. In at least one embodiment, the regeneration gas containing the mixture of the purge gas, $CO_2$, and/or water may be utilized as fuel for one or more processes or components of the system 100 to thereby increase the energy efficiency of the system 100. For example, as illustrated in FIG. 1, the regeneration gas from the separator 140 may be directed to the internal combustion engine 130 of the power generation system 126 via line 278 and utilized as fuel (e.g., supplemental fuel) therein.

In at least one embodiment, the cooling assembly 106 may include one or more heat exchangers (three are shown 142, 144, 146) configured to remove at least a portion of the heat from the process stream flowing therethrough. The heat exchangers 142, 144, 146 may be or include any device capable of at least partially cooling or reducing the temperature of the process fluid flowing therethrough. Illustrative heat exchangers 142, 144, 146 may include, but are not limited to, a direct contact heat exchanger, a cooler, a trim cooler, a mechanical refrigeration unit, or the like, or any combination thereof.

In at least one embodiment, the heat exchangers 142, 144, 146 may be fluidly coupled with and/or in thermal communication with the compression assembly 104. For example, the heat exchangers 142, 144, 146 may be fluidly coupled with one or more of the coolers 132, 134, 136, 138, and/or the compressor stages 114, 116, 118, 120 of the compression assembly 104. As illustrated in FIG. 1, a first heat exchanger 142 may be fluidly coupled with and disposed downstream from the third cooler 136 via line 216 and line 218, and may further be fluidly coupled with and disposed upstream of the fourth compressor stage 120 via line 220. As further illustrated in FIG. 1, a second heat exchanger 144 may be fluidly coupled with and disposed downstream from the fourth cooler 138 via line 224. A third heat exchanger 146 may be fluidly coupled with and disposed downstream from the first cooler 132 via lines 204 and 206, and may further be fluidly coupled with and disposed upstream of the second compressor stage 116 via line 208. The third heat exchanger 146 may also be fluidly coupled with and disposed upstream of the first compressor stage 114 via line 260. In at least one embodiment, one or more of the heat exchangers 142, 144, 146 may be fluidly coupled with the separator 140. For example, as illustrated in FIG. 1, the first heat exchanger 142 may be fluidly coupled with and disposed downstream from the separator 140 via lines 214 and 218.

In at least one embodiment, one or more of the heat exchangers 142, 144, 146 may be fluidly coupled with and/or in thermal communication with a chiller 148 of the cooling assembly 106. For example, as illustrated in FIG. 1, the first heat exchanger 142 may be fluidly coupled with the chiller 148 via a cooling line 268 and a return line 270, and the second heat exchanger 144 may be fluidly coupled with the chiller 148 via a cooling line 272 and a return line 274. The chiller 148 may be configured to cool a process fluid, such as a refrigerant, and direct the refrigerant to each of the first and second heat exchangers 142, 144 via the cooling lines 268, 272. The first and second heat exchangers 142, 144 may receive the refrigerant from the chiller 148 via the cooling lines 268, 272, and transfer the heat from the process stream flowing therethrough to the refrigerant to thereby reduce the temperature of the process stream and/or the natural gas contained therein. The heated refrigerant may be directed back to the chiller 148 via the return lines 270, 274 and subsequently cooled therein. While FIG. 1 illustrates the chiller 148 fluidly coupled with the first and second heat exchangers 142, 144, it may be appreciated that the chiller 148 may also be fluidly coupled with and/or in thermal communication with any of the heat exchangers and/or coolers of the system 100, and configured to deliver the refrigerant to the heat exchangers and/or coolers of the system 100. For example, the chiller 148 may be fluidly coupled with and/or in thermal communication with one or more of the coolers 132, 134, 136, 138 of the compression assembly 104.

In at least one embodiment, one or more of the heat exchangers 142, 144, 146 may not be fluidly coupled with the chiller 148. Accordingly, one or more of the heat exchangers 142, 144, 146 may not be configured to receive the refrigerant from the chiller 148 to cool the process stream flowing therethrough. For example, as further described herein, the third heat exchanger 146 may be configured to receive a recycle stream (i.e., second recycle stream) via line 258 to cool the process stream flowing therethrough.

In at least one embodiment, the chiller 148 may be or include a vapor absorption chiller or non-mechanical chiller configured to receive and be driven by heat (e.g., waste heat, solar heat, etc.). Illustrative non-mechanical chillers may include, but are not limited to, ammonia absorption chillers, lithium bromide absorption chillers, and the like. In another embodiment, the chiller 148 may be a vapor compression chiller or mechanical chiller configured to receive and be driven by electrical energy. For example, as illustrated in FIG. 1, the chiller 148 may be a mechanical chiller operatively coupled with the generator 128 of the power generation system 126 via line 276 and configured to receive and be driven by electrical energy from the generator 128. The mechanical chiller 148 may include a compressor (not shown) and an electric motor (not shown) operatively coupled with the generator 128 and configured to drive the compressor. Accordingly, in an exemplary embodiment, no heat (e.g., waste heat) may be used to drive or operate the mechanical chiller 148. In at least one embodiment, utilizing the mechanical chiller 148 may provide a relatively higher coefficient of performance as compared to the non-mechanical chiller.

In at least one embodiment, the liquefaction assembly 108 may include one or more heat exchangers (four are shown 150, 152, 154, 156) and one or more expansion elements (two are shown 158, 160) fluidly coupled with the one or more of the heat exchangers 150, 152, 154, 156. As further described herein, the expansion elements 158, 160 may be configured to receive one or more portions of the process stream and expand the portions to thereby decrease the temperature and pressure of the process stream and generate one or more refrigeration streams. The refrigeration streams generated by the expansion elements 158, 160 may be directed to one or more of the heat exchangers 150, 152, 154, 156 fluidly coupled therewith to cool the process stream flowing therethrough. For example, the heat exchangers 150, 152, 154, 156 may receive the refrigeration streams and transfer heat from the process streams to the refrigeration streams to thereby cool the process streams.

As illustrated in FIG. 1, a first heat exchanger 150 of the liquefaction assembly 108 may be fluidly coupled with and disposed downstream from the second heat exchanger 144 of the cooling assembly 106 via line 226, and a second heat exchanger 152 of the liquefaction assembly 108 may be fluidly coupled with and disposed downstream from the first heat exchanger 150 of the liquefaction assembly 108 via line 228. As further illustrated in FIG. 1, a third heat exchanger 154 of the liquefaction assembly 108 may be fluidly coupled with and disposed downstream from the second heat exchanger 152 via line 230, and a fourth heat exchanger 156 of the liquefaction assembly 108 may be fluidly coupled with and disposed downstream from the third heat exchanger 154 via line 232. As further illustrated in FIG. 1, the third heat exchanger 154 may also be fluidly coupled with and disposed upstream of the second heat exchanger 152 via line 244, and the fourth heat exchanger 156 may also be fluidly coupled with and disposed upstream of the first heat exchanger 150 via line 256.

As previously discussed, one or more of the expansion elements 158, 160 may be fluidly coupled with one or more of the heat exchangers 150, 152, 154, 156. For example, as illustrated in FIG. 1, a first expansion element 158 may be fluidly coupled with and disposed downstream from the second heat exchanger 152 via lines 230 and 240. The first expansion element 158 may also be fluidly coupled with and disposed upstream of the third heat exchanger 154 via line 242. As further illustrated in FIG. 1, a second expansion element 160 may be fluidly coupled with and disposed downstream from the third heat exchanger 154 via lines 232 and 252. The second expansion element 160 may also be fluidly coupled with and disposed upstream of the fourth heat exchanger 156 via line 254.

In at least one embodiment, one or more of the expansion elements 158, 160 may be or include any device capable of converting a pressure and/or enthalpy drop in the process stream into mechanical energy. The expansion elements 158, 160 may also be or include any device capable of expanding the process stream to decrease the temperature and the pressure of the process stream flowing therethrough. Illustrative expansion elements 158, 160 may include, but are not limited to, a turbine or turbo-expander, a geroler, a gerotor, an expansion valve, such as a Joule-Thomson (JT) valve, or the like, or any combination thereof.

As illustrated in FIG. 1, the first expansion element 158 may be a turbo-expander configured to receive and expand a portion of the process stream from the second heat exchanger 152 to thereby decrease the temperature and pressure of the process stream flowing therethrough. In at least embodiment, the turbo-expander 158 may be configured to convert the pressure drop of the process stream flowing therethrough to mechanical energy. As further described herein, the mechanical energy provided or generated by the turbo-expander 158 may be utilized to drive one or more devices (e.g., generator, alternator, pump, compressor, etc.). While FIG. 1 illustrates the turbo-expander 158 fluidly coupled with and disposed downstream from the second heat exchanger 152, it may be appreciated that the turbo-expander 158 may be fluidly coupled with and disposed downstream from any of the remaining heat exchangers 150, 154, 156 of the liquefaction assembly 108. For example, the turbo-expander 158 may be fluidly coupled with and disposed downstream from the first heat exchanger 150, the third heat exchanger 154, and/or the fourth heat exchanger 156.

In at least one embodiment, the turbo-expander 158 may be coupled with and configured to drive a power generator (not shown) configured to convert the mechanical energy from the turbo-expander 158 into electrical energy. Illustrative power generators may include, but are not limited to, a generator, an alternator, a motor, or the like, or any combination thereof. In at least one embodiment, the electrical energy provided or generated by the power generator may be utilized to drive one or more devices or components of the system 100 to thereby increase the efficiency of the system 100. For example, the electrical energy from the power generator may be utilized (e.g., as supplemental energy) to drive the electric motor 124 of the compression assembly 104.

In another embodiment, the turbo-expander 158 may be operatively coupled with and configured to drive a compressor 164. For example, as illustrated in FIG. 1, the turbo-expander 158 may be coupled with the compressor 164 via a driveshaft 166 and configured to deliver the mechanical energy (e.g., rotational energy) to the compressor 164 via the driveshaft 166. The compressor 164 may be configured to utilize the mechanical energy from the turboexpander 158 to compress the process stream flowing therethrough. In at least one embodiment, the compressor 164 may be fluidly coupled with one or more of the heat exchangers 150, 152, 154, 156 of the liquefaction assembly 108. For example, as illustrated in FIG. 1, the compressor 164 may be fluidly coupled with and disposed downstream of the second heat exchanger 152 via line 246. In at least one embodiment, the compressor 164 may be configured to compress the process stream to reduce the amount of energy that may be required to compress the process stream in the compression assembly 104. For example, the compressor 164 may be fluidly coupled with the compression assembly 104 and configured to deliver the compressed process stream thereto. As illustrated in FIG. 1, the compressor 164 may be fluidly coupled with the third compressor stage 118 of the compression assembly 104 via line 248 and configured to deliver the compressed process stream thereto.

As illustrated in FIG. 1, the second expansion element 160 may be or include an expansion valve, such as a JT valve, configured to receive and expand a portion of the process stream from the third heat exchanger 154. The expansion valve 160 may expand the process stream from the third heat exchanger 154 to thereby decrease the temperature and pressure of the process stream in line 254.

In at least one embodiment, the system 100 may include a storage tank 168 fluidly coupled with the liquefaction assembly 108 and configured to receive and store the natural gas (e.g., the LNG) in the process stream from the liquefaction assembly 108. For example, as illustrated in FIG. 1, the storage tank 168 may be fluidly coupled with and disposed downstream from the fourth heat exchanger 156 of the liquefaction assembly 108 via lines 234 and 236 and configured to receive and store the LNG in the process stream from the fourth heat exchanger 156. The storage tank 168 may be or include any container capable of storing the natural gas (e.g., the LNG and/or the CNG). Illustrative storage tanks may include, but are not limited to, cryogenic storage tanks, vessels, a Dewar-type vessel, or any other container capable of storing the LNG and/or the CNG.

In at least one embodiment, the storage tank 168 may be configured to store the natural gas at a designed storage pressure. In an exemplary embodiment, the designed storage pressure of the storage tank 168 may be from a low of about 100 kPa, about 150 kPa, about 175 kPa, or about 190 kPa to a high of about 210 kPa, about 225 kPa, about 250 kPa, about 300 kPa, or greater. For example, the designed storage pressure of the storage tank 168 may be from about 100 kPa to about 300 kPa, about 150 kPa to about 250 kPa, about 175 kPa to about 225 kPa, or about 190 kPa to about 210 kPa. In at least one embodiment, the storage tank 168 may have a maximum storage pressure or a maximum allowable working pressure (MAWP) rating. The MAWP of the storage tank 168 may be greater than about 250 kPa, greater than about 300 kPa, greater than about 350 kPa, greater than about 400 kPa, greater than about 500 kPa, or greater than about 600 kPa.

In at least one embodiment, a flow control valve or letdown valve 162 may be fluidly coupled with and disposed upstream of the storage tank 168 and configured to decrease the pressure of the process stream directed to the storage tank 168. For example, as illustrated in FIG. 1, the letdown valve 162 may be fluidly coupled with line 236 upstream of the storage tank 168 and configured to decrease the pressure of the process stream flowing therethrough to the designed storage pressure or below the MAWP of the storage tank 168. In at least one embodiment, the letdown valve 162 may be configured to decrease the pressure of the process stream flowing therethrough while maintaining or substantially maintaining the temperature of the process stream flowing therethrough. Accordingly, the process stream in line 236 may have a temperature equal to or substantially equal to the process stream in line 234. In at least one embodiment, the letdown valve 162 may also be configured to maintain a pressure of the process stream in one or more portions of the system 100. For example, the letdown valve 162 may be configured to maintain the pressure (e.g., backpressure) of the process stream in the system 100 upstream thereof.

In an exemplary operation of the system 100, a process stream containing natural gas may be introduced into the system 100 from the natural gas source 102 via line 202. The process stream may be introduced into line 202 at a relatively low pressure (e.g., from about 100 kPa to about 500 kPa). For example, the process stream in line 202 may have a pressure from a low of about 100 kPa, about 150 kPa, about 200 kPa, about 210 kPa, about 220 kPa, about 230 kPa, or about 240 kPa to a high of about 250 kPa, about 260 kPa, about 270 kPa, about 280 kPa, about 290 kPa, about 300 kPa, about 350 kPa, about 400 kPa, about 450 kPa, about 500 kPa, or greater. In another example the process stream in line 202 may have a pressure from about 100 kPa to about 500 kPa, about 150 kPa to about 450 kPa, about 200 kPa to about 400 kPa, about 200 kPa to about 300 kPa, about 210 kPa to about 290 kPa, about 220 kPa to about 280 kPa, about 230 kPa to about 270 kPa, or about 240 kPa to about 260 kPa. In another example, the process stream in line 202 may have a pressure greater than about 200 kPa, greater than about 210 kPa, greater than about 220 kPa, greater than about 230 kPa, greater than about 240 kPa, greater than about 250 kPa, greater than about 260 kPa, greater than about 300 kPa, greater than about 350 kPa, or greater than about 400 kPa. In another example, the process stream in line 202 may have a pressure less than about 500 kPa, less than about 450 kPa, less than about 400 kPa, less than about 350 kPa, less than about 340 kPa, less than about 330 kPa, less than about 320 kPa, less than about 310 kPa, less than about 300 kPa, less than about 290 kPa, less than about 280 kPa, less than about 270 kPa, less than about 260 kPa, less than about 250 kPa, or less than about 240 kPa. In an exemplary embodiment, the process stream in line 202 may have a pressure of about 240 kPa.

In at least one embodiment, the process stream may be introduced into line 202 at a relatively high temperature (e.g., about 5° C. to about 15° C.) or a relatively low temperature (e.g., about 15° C. to about 25° C.). For example, the process stream in line 202 may have a temperature from a low of about 10° C., about 12° C., about 14° C., or about 15° C. to a high of about 16° C., about 18° C., about 20° C., about 22° C., or greater. In another example, the process stream in line 202 may have a temperature from about 10° C. to about 22° C., about 12° C. to about 20° C., about 14° C. to about 18° C., or about 15° C. to about 16° C. In another example, the process stream in line 202 may have a temperature greater than about 10° C., greater than about 12° C., greater than about 14° C., greater than about 15° C., or greater than about 20° C. In another example, the process stream in line 202 may have a temperature less than about 40° C., less than about 35° C., less than about 20° C., less than about 18° C., less than about 16° C., less than about 15° C., less than about 14° C., or less than about 12° C. In an exemplary embodiment, the process stream in line 202 may have a temperature of about 15° C.

In at least one embodiment, a recycle stream (i.e., the second recycle stream) from the first cooler 132 may be combined with the process stream upstream of the separator 140 via line 204 to provide a mixture of the second recycle stream and the natural gas from the natural gas source 102 in line 206. As further described herein, the second recycle stream in line 204 may include "clean" natural gas. The second recycle stream in line 204 may have a pressure from a low of about 210 kPa, about 220 kPa, about 225 kPa, about 230 kPa, or about 235 kPa to a high of about 245 kPa, about 250 kPa, about 255 kPa, about 260 kPa, about 270 kPa, or greater. In another example, the second recycle stream in line 204 may have a pressure from about 210 kPa to about 270 kPa, about 220 kPa to about 260 kPa, about 225 kPa to about 255 kPa, about 230 kPa to about 250 kPa, or about 235 kPa to about 245 kPa. In another example, the second recycle stream in line 204 may have a pressure greater than about 210 kPa, greater than about 220 kPa, greater than about 225 kPa, greater than about 230 kPa, greater than about 235 kPa, greater than about 240 kPa, greater than about 245 kPa, greater than about 250 kPa, greater than about 255 kPa, or greater than about 260 kPa. In another example, the second recycle stream in line 204 may have a pressure less than about 280 kPa, less than about 275 kPa, less than about 270 kPa, less than about 265 kPa, less than about 260 kPa, less than about 255 kPa, less than about 250 kPa, less than about 245 kPa, less than about 240 kPa, less than about 235 kPa, less than about 230 kPa, less than about 220 kPa, or less than about 210 kPa. In an exemplary embodiment, the second recycle stream in line 204 may have a pressure substantially equal to the pressure of the process stream in line 202. For example, the pressure of the second recycle stream in line 204 may be about 240 kPa.

In at least one embodiment, the second recycle stream in line 204 may have a temperature from a low of about 20° C., about 25° C., about 30° C., or about 35° C. to a high of about 45° C., about 50° C., about 55° C., about 60° C., or greater. For example, the second recycle stream in line 204 may have a temperature from about 20° C. to about 60° C., about 25° C. to about 55° C., about 30° C. to about 50° C., or about 35° C. to about 45° C. In another example, the second recycle stream in line 204 may have a temperature greater than about 25° C., greater than about 30° C., greater than about 35° C., greater than about 38° C., or greater than about 40° C. In another example, the second recycle stream in line 204 may have a temperature less than about 65° C., less than about 60° C., less than about 55° C., less than about 50° C., less than about 48° C., less than about 46° C., or less than about 44° C. In an exemplary embodiment, the second recycle stream in line 204 may have a temperature of about 40.5° C.

As previously discussed, the process stream in line 206 may include a mixture of the natural gas from the natural gas source 102 and the second recycle stream from the first cooler 132. In an exemplary embodiment, the second recycle stream in line 204 may be combined with the process stream in line 202 to increase the temperature of the process stream in line 206. For example, the temperature of the process stream in line 206 may be from a low of about 16° C., about 18° C., about 20° C., or about 22° C. to a high of about 26° C., about 28° C., about 30° C., about 32° C., or greater. In another example, the process stream in line 206 may have a temperature from about 16° C. to about 32° C., about 18° C. to about 30° C., about 20° C. to about 28° C., or about 22° C. to about 26° C. In another example, the process stream in line 206 may have a temperature greater than about 16° C., greater than about 18° C., greater than about 20° C., greater than about 22° C., or greater than about 24° C. In another example, the process stream in line 206 may have a temperature less than about 36° C., less than about 34° C., less than about 32° C., less than about 30° C., less than about 28° C., less than about 26° C., less than about 24° C., or less than about 22° C. In at least one embodiment, combining the second recycle stream in line 204 with the process stream in line 202 may not substantially increase or decrease the pressure of the process stream in line 206. For example, the pressure of the process stream in line 202 may be substantially equal to the pressure of the process stream in line 204. In an exemplary embodiment, the pressure of the process stream in line 206 may be about 240 kPa.

The process stream in line 206, containing the mixture of the second recycle stream and the natural gas from the natural gas source 102, may be directed to the third heat exchanger 146 of the cooling assembly 106. The third heat exchanger 146 may absorb at least a portion of the heat in the process stream in line 206 and direct the process stream to the second compressor stage 116 via line 208. The third heat exchanger 146 may cool the process stream to a temperature from a low of about 8° C., about 9° C., about 10° C., or about 11° C. to a high of about 13° C., about 14° C., about 15° C., about 16° C., or greater. For example, the process stream in line 208 may have a temperature from about 8° C. to about 16° C., about 9° C. to about 15° C., about 10° C. to about 14° C., or about 11° C. to about 13° C. In another example, the process stream in line 208 may have a temperature greater than about 8° C., greater than about 9° C., greater than about 10° C., greater than about 11° C., or greater than about 12° C. In another example, the process stream in line 208 may have a temperature less than about 18° C., less than about 17° C., less than about 16° C., less than about 15° C., less than about 14° C., or less than about 13° C. In an exemplary embodiment, the process stream in line 208 may have a temperature of about 12° C. In at least one embodiment, the pressure of the process stream in line 208 may be substantially equal to the pressure of the process stream in line 206. For example, the pressure of the process stream in line 208 may be from about 220 kPa or about 230 kPa. In an exemplary embodiment, the pressure of the process stream in line 208 may be about 227 kPa.

In at least one embodiment, the second compressor stage 116 may compress the process stream in line 208 and direct the compressed process stream to line 210. As previously discussed, the separator 140 and/or the adsorbent contained therein may be configured to adsorb the non-hydrocarbons (e.g., $CO_2$ and/or water) at a predetermined separation pressure. Accordingly, in an exemplary embodiment, the second compressor stage 116 may be configured to compress the process stream to the predetermined separation pressure of the separator 140.

In at least one embodiment, the second compressor stage 116 may compress the process stream from line 208 to a pressure from a low of about 1,000 kPa, about 1,020 kPa, about 1,030 kPa, about 1,040 kPa, or about 1,050 kPa to a high of about 1,060 kPa, about 1,070 kPa, about 1,080 kPa, about 1,090 kPa, about 1,100 kPa, or greater. For example, the pressure of the process stream in line 210 may be from about 1,010 kPa to about 1,100 kPa, about 1,020 kPa to about 1,090 kPa, about 1,020 kPa to about 1,080 kPa, about 1,030 kPa to about 1,070 kPa, or about 1,040 kPa to about 1,060 kPa. In another example, the pressure of the process stream in line 210 may be greater than about 1,000 kPa, greater than about 1,010 kPa, greater than about 1,020 kPa, greater than about 1,030 kPa, greater than about 1,040 kPa, greater than about 1,050 kPa, or greater than about 1,060 kPa. In another example, the pressure of the process stream in line 210 may be less than about 1,200 kPa, less than about 1,100 kPa, less than about 1,080 kPa, less than about 1,060 kPa, less than about 1,040 kPa, or less than about 1,020 kPa. In an exemplary embodiment, the pressure of the process stream in line 210 may be about 1,055 kPa.

In at least one embodiment, compressing the process stream in the second compressor stage 116 may generate heat (e.g., the heat of compression) to thereby increase the temperature of the process stream in line 210. For example, the process stream in line 210 may have a temperature from a low of about 95° C., about 100° C., about 102° C., or about 104° C. to a high of about 106° C., about 108° C., about 110° C., about 115° C., or greater. In another example, the process stream in line 210 may have a temperature from about 95° C. to about 115° C., about 100° C. to about 110° C., about 102° C. to about 108° C., or about 104° C. to about 106° C. In another example, the process stream in line 210 may have a temperature greater than about 100° C., greater than about 102° C., greater than about 104° C., greater than about 106° C., or greater than about 108° C. In another example, the process stream in line 210 may have a temperature less than about 110° C., less than about 108° C., less than about 106° C., less than about 105° C., or less than about 104° C. In an exemplary embodiment, the process stream in line 210 may have a temperature of about 104° C.

In at least one embodiment, the process stream in line 210 may be directed to the second cooler 134 of the compression assembly 104. The second cooler 134 may absorb at least a portion of the heat (e.g., the heat of compression) from the process stream and direct the process stream to the separator 140 fluidly coupled therewith via line 212. In at least one embodiment, the second cooler 134 may cool the process stream from line 210 to a temperature from a low of about 40° C., about 50° C., about 55° C., or about 60° C. to a high of about 70° C., about 75° C., about 80° C., about 90° C., or greater. For example, the process stream in line 212 may have a temperature from about 40° C. to about 90° C., about 50° C. to about 80° C., about 55° C. to about 75° C., or about 60° C. to about 70° C. In another example, the process stream in line 212 may have a temperature greater than about 50° C., greater than about 55° C., greater than about 60° C., greater than about 65° C., or greater than about 70° C. In another example, the process stream in line 212 may have a temperature less than about 100° C., less than about 95° C., less than about 90° C., less than about 85° C., less than about 80° C., less than about 75° C., or less than about 70° C. In an exemplary embodiment, the temperature of the process stream in line 212 may be about 65.5° C.

In at least one embodiment, the pressure of the process stream in line 212 may be at the predetermined separation pressure of the separator 140. For example, the pressure of the process stream in line 212 may be from a low of about 600 kPa, about 650 kPa, about 700 kPa, about 750 kPa, about 800 kPa, about 850 kPa, about 900 kPa, about 950 kPa, about 975 kPa, or about 1,000 kPa to a high of about 1,025 kPa, about 1,050 kPa, about 1,100 kPa, about 1,150 kPa, about 1,200 kPa, about 1,250 kPa, about 1,300 kPa, about 1,350 kPa, about 1,400 kPa, about 1,500 kPa, or greater. In another example, the pressure of the process stream in line 212 may be about 600 kPa to about 1,500 kPa, about 650 kPa to about 1,400 kPa, about 700 kPa to about 1,350 kPa, about 750 kPa to about 1,300 kPa, about 800 kPa to about 1,250 kPa, about 850 kPa to about 1,200 kPa, about 900 kPa to about 1,150 kPa, about 950 kPa to about 1,100 kPa, about 975 kPa to about 1,050 kPa, or about 1,000 kPa to about 1,025 kPa. In another example, the process stream in line 212 may have a pressure greater than about 900 kPa, greater than about 1,000 kPa, greater than about 1,005 kPa, greater than about 1,010 kPa, greater than about 1,015 kPa, greater than about 1,020 kPa, greater than about 1,025 kPa, greater than about 1,030 kPa, greater than about 1,035 kPa, greater than about 1,040 kPa, greater than about 1,045 kPa, greater than about 1,050 kPa, greater than about 1,100 kPa, greater than about 1,150 kPa, greater than about 1,200 kPa, greater than about 1,250 kPa, greater than about 1,300 kPa, or greater than about 1,400 kPa. In an exemplary embodiment, the pressure of the process stream in line 212 may be about 1,027 kPa.

As previously discussed, the separator 140 may receive the process stream via line 212, separate at least a portion of the non-hydrocarbons from the process stream, and direct the process stream to line 214. In at least one embodiment, the separator 140 may separate water and/or $CO_2$ from the natural gas in the process stream to thereby provide the process stream in line 214 with "clean" natural gas. For example, the separator 140 may remove water and/or $CO_2$ from the natural gas in the process stream to increase the relative concentration of the hydrocarbons and provide the "clean" natural gas. The terms "clean" natural gas or "clean" process stream may refer to any natural gas or process stream that has been processed by the separator 140 to remove at least a portion of the non-hydrocarbons contained therein. The terms "clean" natural gas or "clean" process stream may also refer to any natural gas or process stream having a concentration of $CO_2$ from a low of about 1%, about 2%, about 3%, about 4%, or about 5% to a high of about 10%, about 12%, about 14%, about 16%, about 18%, about 20%, or greater. For example, the "clean" natural gas or the "clean" process stream may have a concentration of $CO_2$ less than 20%, less than about 18%, less than about 15%, less than about 10%, less than about 5%, less than about 4%, less than about 2%, or less than about 1%. The terms "clean" natural gas or "clean" process stream may further refer to any natural gas or process stream having a concentration of water from a low of about 1%, about 2%, about 3%, about 4%, or about 5% to a high of about 10%, about 12%, about 14%, about 16%, about 18%, about 20%, or greater. For example, the "clean" natural gas or the "clean" process stream may have a concentration of water less than about 20%, less than about 18%, less than about 15%, less than about 10%, less than about 5%, less than about 4%, less than about 2%, or less than about 1%.

In at least one embodiment, the process stream in line 214 may have a pressure from a low of about 925 kPa, about 935 kPa, about 945 kPa, about 950 kPa, or about 955 kPa to a high of about 960 kPa, about 965 kPa, about 970 kPa, about 980 kPa, about 990 kPa, or greater. For example, the pressure of the process stream in line 214 may be from about 925 kPa to about 990 kPa, about 935 kPa to about 980 kPa, about 945 kPa to about 970 kPa, about 950 kPa to about 965 kPa, or about 955 kPa to about 960 kPa. In another example, the pressure of the process stream in line 214 may be greater than about 925 kPa, greater than about 935 kPa, greater than about 945 kPa, greater than about 950 kPa, greater than about 955 kPa, greater than about 960 kPa, greater than about 965 kPa, greater than about 970 kPa, or greater than about 980 kPa. In another example, the pressure of the process stream in line 214 may be less than about 1,000 kPa, less than about 990 kPa, less than about 980 kPa, less than about 970 kPa, less than about 965 kPa, less than about 960 kPa, or less than about 955 kPa. In an exemplary embodiment, the pressure of the process stream in line 214 may be about 958 kPa.

In at least one embodiment, the process stream in line 214 may have a temperature from a low of about 40° C., about 45° C., about 50° C., or about 55° C. to a high of about 65° C., about 70° C., about 75° C., about 80° C., or greater. For example, the process stream in line 214 may have a temperature from about 40° C. to about 80° C., about 45° C. to about 75° C., about 50° C. to about 70° C., or about 55° C. to about 65° C. In another example, the process stream in line 214 may have a temperature greater than about 40° C., greater than about 50° C., greater than about 55° C., greater than about 60° C., or greater than about 65° C. In another example, the process stream in line 214 may have a temperature less than about 90° C., less than about 80° C., less than about 70° C., less than about 65° C., less than about 60° C., less than about 55° C., or less than about 50° C. In an exemplary embodiment, the temperature of the process stream in line 214 may be about 60° C.

In at least one embodiment, a recycle stream (i.e., the first recycle stream) from the third cooler 136 may be combined with the process stream in line 214 downstream from the separator 140 via line 216. As further described herein, the first recycle stream in line 216 may include "clean" natural gas. The first recycle stream in line 216 may have a temperature relatively lower than the temperature of the process stream in line 214. For example, the temperature of the first recycle stream in line 216 may be from a low of about 20° C., about 25° C., about 30° C., or about 35° C. to a high of about 45° C., about 50° C., about 55° C., about 60° C., or greater. In another example, the first recycle stream in line 216 may have a temperature from about 20° C. to about 60° C., about 25° C. to about 55° C., about 30° C. to about 50° C., or about 35° C. to about 45° C. In another example, the first recycle stream in line 216 may have a temperature greater than about 25° C., greater than about 30° C., greater than about 35° C., greater than about 38° C., or greater than about 40° C. In another example, the first recycle stream in line 216 may have a temperature less than about 65° C., less than about 60° C., less than about 55° C., less than about 50° C., less than about 48° C., less than about 46° C., less than about 44° C., or less than about 42° C. In an exemplary embodiment, the first recycle stream in line 216 may have a temperature of about 40.5° C. In at least one embodiment, the pressure of the first recycle stream in line 216 may be substantially equal to the pressure of the process stream in line 214. For example, the pressure of the first recycle stream in line 216 may be about 958 kPa.

In at least one embodiment, the process stream in line 218 may include a mixture of the natural gas from the natural gas source 102, the first recycle stream, and/or the second recycle stream. In an exemplary embodiment, combining the first recycle stream in line 216 with the process stream in line 214 may increase the temperature of the process stream. For example, the temperature of the process stream in line 218 may be from a low of about 30° C., about 35° C., about 40° C., about 45° C., or about 50° C. to a high of about 55° C., about 60° C., about 65° C., about 70° C., about 75° C., or greater. In another example, the process stream in line 206 may have a temperature from about 30° C. to about 75° C., about 35° C. to about 70° C., about 40° C. to about 65° C., or about 45° C. to about 60° C. In another example, the process stream in line 218 may have a temperature greater than about 35° C., greater than about 40° C., greater than about 45° C., greater than about 50° C., or greater than about 55° C. In another example, the process stream in line 218 may have a temperature less than about 75° C., less than about 70° C., less than about 65° C., less than about 60° C., less than about 55° C., or less than about 50° C. As previously discussed, the pressure of the first recycle stream in line 216 may be substantially equal to the pressure of the process stream in line 214. Accordingly, combining the first recycle stream in line 216 with the process stream in line 214 may not substantially increase or decrease the pressure of the process stream in line 218. In an exemplary embodiment, the pressure of the process stream in line 218 may be about 958 kPa.

In at least one embodiment, the process stream in line 218 may be directed to the first heat exchanger 142 of the cooling assembly 106 and subsequently cooled therein. As previously discussed, the first heat exchanger 142 may be fluidly coupled with the chiller 148 and configured to receive the refrigerant therefrom via the cooling line 268. The first heat exchanger 142 may transfer the heat from the process stream to the refrigerant to thereby reduce the temperature of the process stream in line 220. For example, the temperature of the process stream in line 220 may be from a low of about −10° C., about −5° C., about 0° C., or about 1° C. to a high of about 2° C., about 3° C., about 5° C., about 10° C., or greater. In another example, the process stream in line 220 may have a temperature from about −10° C. to about 10° C., about −5° C. to about 5° C., about 0° C. to about 3° C., or about 1° C. to about 2° C. In another example, the process stream in line 220 may have a temperature greater than about −10° C., greater than about −5° C., greater than about −2° C., greater than about 0° C., or greater than about 1° C. In another example, the process stream in line 220 may have a temperature less than about 10° C., less than about 8° C., less than about 6° C., less than about 4° C., less than about 2° C., less than about 1.5° C., less than about 1° C., or less than about 0° C. In an exemplary embodiment, the temperature of the process stream in line 220 may be about 1.7° C. In at least one embodiment, the pressure of the process stream in line 220 may be equal to or substantially equal to the pressure of the process stream in line 218. For example, the pressure of the process stream in line 220 may be from about 940 kPa to about 960 kPa. In an exemplary embodiment, the pressure of the process stream may be from about 945 kPa.

In at least one embodiment, the process stream from the first heat exchanger 142 may be directed to the fourth compressor stage 120 via line 220. The fourth compressor stage 120 may compress the process stream from line 220 and direct the compressed process stream to line 222. The fourth compressor stage 120 may compress the process stream from line 220 to a pressure from a low of about 2,630 kPa, about 2,635 kPa, about 2,640 kPa, about 2,645 kPa, or about 2,647 kPa to a high of about 2,648 kPa, about 2,650 kPa, about 2,655 kPa, about 2,660 kPa, about 2,665 kPa, or greater. For example, the pressure of the process stream in line 222 may be from about 2,630 kPa to about 2,665 kPa, about 2,640 kPa to about 2,655 kPa, about 2,645 kPa to about 2,650 kPa, or about 2,647 kPa to about 2,648 kPa. In another example, the pressure of the process stream in line 222 may be greater than about 2,630 kPa, greater than about 2,635 kPa, greater than about 2,640 kPa, greater than about 2,645 kPa, greater than about 2,650 kPa, greater than about 2,660 kPa, greater than about 2,670 kPa, or greater than about 2,680 kPa. In another example, the pressure of the process stream in line 222 may be less than about 2,675 kPa, less than about 2,670 kPa, less than about 2,665 kPa, less than about 2,660 kPa, less than about 2,655 kPa, less than about 2,650 kPa, or less than about 2,648 kPa. In an exemplary embodiment, the pressure of the process stream in line 222 may be about 2,648 kPa.

In at least one embodiment, compressing the process stream in the fourth compressor stage 120 may generate heat (e.g., the heat of compression) to thereby increase the temperature of the process stream in line 222. For example, the process stream in line 222 may have a temperature from a low of about 75° C., about 78° C., about 80° C., or about 82° C. to a high of about 84° C., about 85° C., about 88° C., about 90° C., or greater. In another example, the process stream in line 222 may have a temperature from about 75° C. to about 90° C., about 78° C. to about 88° C., about 80° C. to about 85° C., or about 82° C. to about 84° C. In another example, the process stream in line 222 may have a temperature greater than about 70° C., greater than about 75° C., greater than about 78° C., greater than about 80° C., or greater than about 82° C. In another example, the process stream in line 222 may have a temperature less than about 94° C., less than about 92° C., less than about 90° C., less than about 88° C., less than about 86° C., less than about 84° C., less than about 82° C., or less than about 80° C. In an exemplary embodiment, the process stream in line 222 may have a temperature of about 83° C.

As illustrated in FIG. 1, the process stream in line 222 may be directed to the fourth cooler 138 of the compression assembly 104. The fourth cooler 138 may absorb at least a portion of the heat (e.g., the heat of compression) from the process stream and direct the process stream to the second heat exchanger 144 of the cooling assembly 106 via line 224. In at least one embodiment, the process stream in line 224 may have a temperature from a low of about 20° C., about 25° C., about 30° C., or about 35° C. to a high of about 45° C., about 50° C., about 55° C., about 60° C., or greater. For example, the process stream in line 224 may have a temperature from about 20° C. to about 60° C., about 25° C. to about 55° C., about 30° C. to about 50° C., or about 35° C. to about 45° C. In another example, the process stream in line 224 may have a temperature greater than about 25° C., greater than about 30° C., greater than about 35° C., greater than about 38° C., or greater than about 40° C. In another example, the process stream in line 224 may have a temperature less than about 65° C., less than about 60° C., less than about 55° C., less than about 50° C., less than about 48° C., less than about 46° C., less than about 44° C., or less than about 42° C. In an exemplary embodiment, the process stream in line 224 may have a temperature of about 40.5° C. In at least one embodiment, the pressure of the process stream in line 224 may be substantially equal to the pressure of the process stream in line 222. For example, the pressure of the process stream in line 224 may be from about 2,620 kPa to about 2,650 kPa. In an exemplary embodiment, the pressure of the process stream in line 224 may be about 2,620 kPa.

The second heat exchanger 144 of the cooling assembly 106 may further cool the process stream from the fourth cooler 138 and direct the cooled process stream to line 226. As previously discussed, the second heat exchanger 144 may be fluidly coupled with the chiller 148 and configured to receive the refrigerant therefrom via the cooling line 272. The second heat exchanger 144 may transfer the heat from the process stream to the refrigerant to thereby reduce the temperature of the process stream in line 226. For example, the temperature of the process stream in line 226 may be from a low of about −30° C., about −25° C., about −22° C., or about −20° C. to a high of about −19° C., about −17° C., about −15° C., about −10° C., or greater. In another example, the process stream in line 226 may have a temperature from about −30° C. to about −10° C., about −25° C. to about −15° C., about −22° C. to about −17° C., or about −20° C. to about −19° C. In another example, the process stream in line 226 may have a temperature greater than about −30° C., greater than about −25° C., greater than about −22° C., greater than about −20° C., or greater than about −18° C. In another example, the process stream in line 226 may have a temperature less than about 0° C., less than about −5° C., less than about −10° C., less than about −15° C., less than about −17° C., or less than about −19° C. In an exemplary embodiment, the process stream in line 226 may have a temperature of about −19.5° C.

In at least one embodiment, the pressure of the process stream in line 226 may be from a low of about 2,545 kPa, about 2,550 kPa, about 2,555 kPa, about 2,560 kPa, or about 2,563 kPa to a high of about 2,568 kPa, about 2,570 kPa, about 2,575 kPa, about 2,580 kPa, about 2,585 kPa, or greater. For example, the pressure of the process stream in line 226 may be from about 2,545 kPa to about 2,585 kPa, about 2,550 kPa to about 2,580 kPa, about 2,555 kPa to about 2,575 kPa, about 2,560 kPa to about 2,570 kPa, or about 2,563 kPa to about 2,568 kPa. In an exemplary embodiment, the pressure of the process stream in line 226 may be about 2,565 kPa.

In at least one embodiment, at least a portion of the process stream in line 226 may contain the natural gas in the supercritical state. For example, at least a portion of the process stream in line 226 may contain the CNG. As illustrated in FIG. 1, the process stream in line 226 may be directed to the first heat exchanger 150 of the liquefaction assembly 108 and subsequently cooled therein. In at least one embodiment, a refrigeration stream (i.e., the second refrigeration stream) may be directed to the first heat exchanger 150 via line 256 to cool the process stream in line 226. As further described herein, the second refrigeration stream may be provided by the expansion valve 160 of the liquefaction assembly 108. The first heat exchanger 150 may transfer heat from the process stream to the second refrigeration stream and direct the cooled process stream to the second heat exchanger 152 of the liquefaction assembly 108 via line 228. In at least one embodiment, the first heat exchanger 150 may cool the process stream to a temperature from a low of about −40° C., about −38° C., about −33° C., or about −30° C. to a high of about −28° C., about −25° C., about −20° C., about −15° C., or greater. For example, the process stream in line 228 may have a temperature from about −40° C. to about −15° C., about −38° C. to about −20° C., about −33° C. to about −25° C., or about −30° C. to about −28° C. In another example, the process stream in line 228 may have a temperature greater than about −40° C., greater than about −38° C., greater than about −33° C., greater than about −30° C., or greater than about −29° C. In another example, the process stream in line 228 may have a temperature less than about −28° C., less than about −25° C., less than about −20° C., less than about −15° C., or less than about −10° C. In an exemplary embodiment, the process stream in line 228 may have a temperature of about −29° C. In at least one embodiment, the pressure of the process stream in line 228 may be substantially equal to the pressure of the process stream in line 226. For example, the pressure of the process stream in line 228 may be from about 2,555 kPa to about 2,565 kPa. In an exemplary embodiment, the pressure of the process stream in line 228 may be about 2,558 kPa.

In at least one embodiment, the second heat exchanger 152 may absorb at least a portion of the heat in the process stream and direct at least a portion of the process stream to the third heat exchanger 154 of the liquefaction assembly 108 via line 230. A refrigeration stream (i.e., the first refrigeration stream) may be directed to the second heat exchanger 152 via line 244 to cool the process stream in line 228. As further described herein, the first refrigeration stream may be provided by the turbo-expander 158 of the liquefaction assembly 108. The second heat exchanger 152 may transfer heat from the process stream to the first refrigeration stream and direct at least a portion of the cooled process stream to the third heat exchanger 154 via line 230. As further described herein, at least a portion of the cooled process stream from the second heat exchanger 152 may also be directed to the turbo-expander 158 to generate the first refrigeration stream.

In at least one embodiment, the second heat exchanger 152 may cool the process stream to a temperature from a low of about −85° C., about −80° C., about −75° C., or about −70° C. to a high of about −65° C., about −60° C., about −55° C., about −50° C., or greater. For example, the process stream in line 230 may have a temperature from about −85° C. to about −50° C., about −80° C. to about −55° C., about −75° C. to about −60° C., or about −70° C. to about −65° C. In another example, the process stream in line 230 may have a temperature greater than about −85° C., greater than about −80° C., greater than about −75° C., greater than about −70° C., or greater than about −68° C. In another example, the process stream in line 230 may have a temperature less than about −50° C., less than about −55° C., less than about −60° C., less than about −65° C., or less than about −68° C. In an exemplary embodiment, the temperature of the process stream in line 230 may be about 68° C. In at least one embodiment, the pressure of the process stream in line 230 may be substantially equal to the pressure of the process stream in line 228. For example, the pressure of the process stream in line 230 may be from about 2,550 kPa to about 2,560 kPa. In an exemplary embodiment, the pressure of the process stream in line 230 may be about 2,551 kPa.

The third heat exchanger 154 may absorb at least a portion of the heat in the process stream and direct at least a portion of the process stream to the fourth heat exchanger 156 of the liquefaction assembly 108 via line 232. In at least one embodiment, a refrigeration stream (i.e., the first refrigeration stream) may be directed to the third heat exchanger 154 via line 242 to cool the process stream flowing therethrough. The third heat exchanger 154 may transfer heat from the process stream to the first refrigeration stream and direct at least a portion of the cooled process stream to the fourth heat exchanger 156 via line 232. As further described herein, at least a portion of the cooled process stream from the third heat exchanger 154 may also be directed to the expansion valve 160 to generate the second refrigeration stream.

In at least one embodiment, the third heat exchanger 154 may cool the process stream to a temperature from a low of about −130° C., about −125° C., about −122° C., or about −120° C. to a high of about −115° C., about −112° C., about −110° C., about −105° C., or greater. For example, the process stream in line 232 may have a temperature from about −130° C. to about −105° C., about −125° C. to about −110° C., about −122° C. to about −112° C., or about −120° C. to about −115° C. In another example, the process stream in line 232 may have a temperature greater than about −130° C., greater than about −125° C., greater than about −120° C., greater than about −115° C., or greater than about −110° C. In another example, the process stream in line 232 may have a temperature less than about −100° C., less than about −105° C., less than about −110° C., less than about −112° C., or less than about −115° C. In an exemplary embodiment, the process stream in line 232 may have a temperature of about −117° C. In at least one embodiment, the pressure of the process stream in line 232 may be substantially equal to the pressure of the process stream in line 230. For example, the pressure of the process stream in line 232 may be from about 2,540 kPa to about 2,560 kPa. In an exemplary embodiment, the pressure of the process stream in line 232 may be about 2,551 kPa.

In at least one embodiment, at least a portion of the process stream in line 232 may contain the natural gas in the supercritical state and/or the subcritical state. For example, at least a portion of the process stream in line 232 may contain the CNG and/or the LNG. As previously discussed, at least a portion of the process stream from the third heat exchanger 154 may be directed to the fourth heat exchanger 156 via line 232 and cooled therein. In at least one embodiment, the fourth heat exchanger 156 may cool the process stream and/or the natural gas contained therein to the subcritical state. For example, the fourth heat exchanger 156 may be configured to cool the process stream and/or the natural gas contained therein to a temperature below its saturation temperature (i.e., boiling point), at a given or predetermined pressure. According, the fourth heat exchanger 156 may be configured to cool at least a portion of the natural gas in the process stream to LNG. In another embodiment, the fourth heat exchanger 156 may be configured to subcool the process stream and/or the natural gas contained therein.

In at least one embodiment, a refrigeration stream (i.e., the second refrigeration stream) may be directed to the fourth heat exchanger 156 via line 254 to cool the process stream in line 232. The fourth heat exchanger 156 may transfer heat from the process stream to the second refrigeration stream and direct the cooled process stream to the letdown valve 162 via line 234. In at least one embodiment, the fourth heat exchanger 156 may cool the process stream to a temperature from a low of about −175° C., about −170° C., about −165° C., or about −160° C. to a high of about −155° C., about −150° C., about −145° C., about −140° C., or greater. For example, the process stream in line 234 may have a temperature from about −175° C. to about −140° C., about −170° C. to about −145° C., about −165° C. to about −150° C., or about −160° C. to about −155° C. In another example, the process stream in line 234 may have a temperature greater than about −180° C., greater than about −170° C., greater than about −165° C., greater than about −160° C., or greater than about −155° C. In another example, the process stream in line 234 may have a temperature less than about −140° C., less than about −145° C., less than about −150° C., less than about −155° C., less than about −150° C., or less than about −145° C. In an exemplary embodiment, the process stream in line 234 may have a temperature of about −157° C. In at least one embodiment, the pressure of the process stream in line 234 may be substantially equal to the pressure of the process stream in line 232. For example, the pressure of the process stream in line 234 may be from about 2,530 kPa to about 2,560 kPa. In an exemplary embodiment, the pressure of the process stream in line 234 may be about 2,537 kPa.

In at least one embodiment, the letdown valve 162 may decrease the pressure of the process stream in line 234 and direct the process stream to the storage tank 168 via line 236. The pressure of the process stream in line 236 may be from a low of about 195 kPa, about 200 kPa, about 202 kPa, about 205 kPa, or about 206 kPa to a high of about 208 kPa, about 210 kPa, about 212 kPa, about 215 kPa, about 225 kPa, or greater. For example, the pressure of the process stream in line 236 may be from about 195 kPa to about 220 kPa, about 200 kPa to about 215 kPa, about 202 kPa to about 212 kPa, about 205 kPa to about 210 kPa, or about 206 kPa to about 208 kPa. In another example, the pressure of the process stream in line 236 may be greater than about 196 kPa, greater than about 200 kPa, greater than about 202 kPa, greater than about 205 kPa, greater than about 206 kPa, greater than about 207 kPa, greater than about 208 kPa, or greater than about 210 kPa. In another example, the pressure of the process stream in line 236 may be less than about 230 kPa, less than about 225 kPa, less than about 220 kPa, less than about 218 kPa, less than about 216 kPa, less than about 214 kPa, less than about 212 kPa, or less than about 210 kPa. In an exemplary embodiment, the pressure of the process stream in line 236 may be about 207 kPa.

As previously discussed, the letdown valve 162 may be configured to decrease the pressure of the natural gas in the process stream while maintaining or substantially maintaining the temperature of the natural gas in the process stream. Accordingly, the temperature of the process stream in line 236 may be equal or substantially equal to the process stream in line 234. For example, the temperature of the process stream in line 236 may be from a low of about −175° C., about −170° C., about −165° C., or about −160° C. to a high of about −155° C., about −150° C., about −145° C., about −140° C., or greater. In another example, the process stream in line 236 may have a temperature from about −175° C. to about −140° C., about −170° C. to about −145° C., about −165° C. to about −150° C., or about −160° C. to about −155° C. In another example, the process stream in line 236 may have a temperature greater than about −180° C., greater than about −170° C., greater than about −165° C., greater than about −160° C., or greater than about −155° C. In another example, the process stream in line 236 may have a temperature less than about −140° C., less than about −145° C., less than about −150° C., less than about −155° C., less than about −160° C., or less than about −165° C. In an exemplary embodiment, the temperature of the process stream in line 236 may be about −157° C.

As previously discussed, at least a portion of the process stream from the second heat exchanger 152 may be directed to the turbo-expander 158 to generate the first refrigeration stream. For example, as illustrated in FIG. 1, a portion of the process stream from the second heat exchanger 152 may be directed to the turbo-expander 158 via line 240 to generate the first refrigeration stream. The turbo-expander 158 may expand the portion of the process stream from the second heat exchanger 152 to decrease the temperature and pressure of the process stream and thereby generate the first refrigeration stream in line 242. In at least one embodiment, the first refrigeration stream in line 242 may have a pressure from a low of about 150 kPa, about 155 kPa, about 160 kPa, about 165 kPa, or about 170 kPa to a high of about 175 kPa, about 180 kPa, about 185 kPa, about 190 kPa, about 195 kPa, or greater. For example, the pressure of the first refrigeration stream in line 242 may be from about 150 kPa to about 195 kPa, about 155 kPa to about 190 kPa, about 160 kPa to about 185 kPa, about 165 kPa to about 180 kPa, or about 170 kPa to about 175 kPa. In another example, the pressure of the first refrigeration stream in line 242 may be greater than about 150 kPa, greater than about 155 kPa, greater than about 160 kPa, greater than about 165 kPa, greater than about 170 kPa, greater than about 175 kPa, greater than about 180 kPa, or greater than about 185 kPa. In another example, the pressure of the first refrigeration stream in line 242 may be less than about 200 kPa, less than about 195 kPa, less than about 190 kPa, less than about 185 kPa, less than about 180 kPa, less than about 175 kPa, less than about 170 kPa, or less than about 165 kPa. In an exemplary embodiment, the pressure of the first refrigeration stream in line 242 may be about 172 kPa.

In at least one embodiment, the first refrigeration stream in line 242 may have a temperature from a low of about −160° C., about −155° C., about −150° C., about −145° C., about −140° C. to a high of about −135° C., about −130° C., about −125° C., about −120° C., about −115° C. or greater. For example, the first refrigeration stream in line 242 may have a temperature from about −160° C. to about −115° C., about −155° C. to about −120° C., about −150° C. to about −125° C., about −145° C. to about −130° C., or about −140° C. to about −135° C. In another example, the first refrigeration stream in line 242 may have a temperature greater than about −160° C., greater than about −155° C., greater than about −150° C., greater than about −145° C., or greater than about −140° C. In another example, the first refrigeration stream in line 242 may have a temperature less than about −120° C., less than about −125° C., less than about −130° C., less than about −135° C., or less than about −140° C. In an exemplary embodiment, the first refrigeration stream in line 242 may have a temperature of about −137° C.

In at least one embodiment, the first refrigeration stream in line 242 may be directed to one or more of the heat exchangers 150, 152, 154, 156 of the liquefaction assembly 108. For example, as illustrated in FIG. 1, the first refrigeration stream may be directed to the third heat exchanger 154 via line 242 to absorb the heat from the process stream flowing therethrough from line 230 to line 232. In at least one embodiment, the first refrigeration stream may be heated in the third heat exchanger 154 to a temperature from a low of about −115° C., about −110° C., about −105° C., or about −100° C. to a high of about −95° C., about −90° C., about −85° C., about −80° C., or greater. For example, the first refrigeration stream in line 244 may have a temperature from about −115° C. to about −80° C., about −110° C. to about −85° C., about −105° C. to about −90° C., or about −100° C. to about −95° C. In another example, the first refrigeration stream in line 244 may have a temperature greater than about −115° C., greater than about −110° C., greater than about −105° C., greater than about −100° C., or greater than about −95° C. In another example, the first refrigeration stream in line 244 may have a temperature less than about −80° C., less than about −85° C., less than about −90° C., less than about −95° C., less than about −100° C., or less than about −105° C. In an exemplary embodiment, the first refrigeration stream in line 244 may have a temperature of about −98° C.

In at least one embodiment, the pressure of the first refrigeration stream in line 244 may be from a low of about 130 kPa, about 135 kPa, about 140 kPa, about 145 kPa, or about 150 kPa to a high of about 155 kPa, about 160 kPa, about 165 kPa, about 170 kPa, about 175 kPa, or greater. For example, the pressure of the first refrigeration stream in line 244 may be from about 130 kPa to about 175 kPa, about 135 kPa to about 170 kPa, about 140 kPa to about 165 kPa, about 145 kPa to about 160 kPa, or about 150 kPa to about 155 kPa. In another example, the pressure of the first refrigeration stream in line 244 may be greater than about 130 kPa, greater than about 135 kPa, greater than about 140 kPa, greater than about 145 kPa, greater than about 150 kPa, greater than about 155 kPa, greater than about 160 kPa, or greater than about 165 kPa. In another example, the pressure of the first refrigeration stream in line 244 may be less than about 180 kPa, less than about 175 kPa, less than about 170 kPa, less than about 165 kPa, less than about 160 kPa, less than about 155 kPa, less than about 150 kPa, or less than about 145 kPa. In an exemplary embodiment, the pressure of the first refrigeration stream in line 244 may be about 151 kPa.

In at least one embodiment, the first refrigeration stream from the third heat exchanger 154 may be directed to the second heat exchanger 152 via line 244 to absorb the heat from the process stream flowing therethrough. The first refrigeration stream may be heated in the second heat exchanger 152 to a temperature from a low of about −60° C., about −55° C., about −50° C., or about −45° C. to a high of about −40° C., about −35° C., about −30° C., about −25° C., or greater. For example, the first refrigeration stream in line 246 may have a temperature from about −60° C. to about −25° C., about −55° C. to about −30° C., about −50° C. to about −35° C., or about −45° C. to about −40° C. In another example, the first refrigeration stream in line 246 may have a temperature greater than about −60° C., greater than about −55° C., greater than about −50° C., greater than about −45° C., or greater than about −40° C. In another example, the first refrigeration stream in line 246 may have a temperature less than about −20° C., less than about −25° C., less than about −30° C., less than about −35° C., or less than about −40° C. In an exemplary embodiment, the first refrigeration stream in line 246 may have a temperature of about −42° C.

In at least one embodiment, the pressure of the first refrigeration stream in line 246 may be from a low of about 95 kPa, about 100 kPa, about 105 kPa, about 110 kPa, or about 115 kPa to a high of about 120 kPa, about 125 kPa, about 130 kPa, about 135 kPa, about 140 kPa, or greater. For example, the pressure of the first refrigeration stream in line 246 may be from about 95 kPa to about 140 kPa, about 100 kPa to about 135 kPa, about 105 kPa to about 130 kPa, about 110 kPa to about 125 kPa, or about 115 kPa to about 120 kPa. In another example, the pressure of the first refrigeration stream in line 246 may be greater than about 95 kPa, greater than about 100 kPa, greater than about 105 kPa, greater than about 110 kPa, greater than about 115 kPa, greater than about 120 kPa, or greater than about 125 kPa. In another example, the pressure of the first refrigeration stream in line 246 may be less than about 150 kPa, less than about 145 kPa, less than about 140 kPa, less than about 135 kPa, less than about 130 kPa, less than about 125 kPa, or less than about 120 kPa. In an exemplary embodiment, the pressure of the first refrigeration stream in line 246 may be about 117 kPa.

In at least one embodiment, the first refrigeration stream in line 246 may contain "clean" natural gas, and may be directed to the compression assembly 104 to provide the first recycle stream for the system 100. For example, the first refrigeration stream in line 246 may be directed to the compression assembly 104 as the first recycle stream and subsequently combined with the process stream flowing through the compression assembly 104. In at least one embodiment, the first recycle stream may be compressed before being directed to the compression assembly 104 via line 248. For example, as illustrated in FIG. 1, the first recycle stream may be compressed in the compressor 164 before being directed to the compression assembly 104. In at least one embodiment, the compressor 164 may compress the first recycle stream to a pressure from a low of about 275 kPa, about 280 kPa, about 285 kPa, about 290 kPa, or about 295 kPa to a high of about 300 kPa, about 305 kPa, about 310 kPa, about 315 kPa, about 320 kPa, or greater. For example, the pressure of the first recycle stream in line 248 may be from about 275 kPa to about 320 kPa, about 280 kPa to about 315 kPa, about 285 kPa to about 310 kPa, about 290 kPa to about 305 kPa, or about 295 kPa to about 300 kPa.

In another example, the pressure of the first recycle stream in line 248 may be greater than about 275 kPa, greater than about 280 kPa, greater than about 285 kPa, greater than about 290 kPa, greater than about 295 kPa, greater than about 300 kPa, greater than about 305 kPa, greater than about 310 kPa, or greater than about 315 kPa. In another example, the pressure of the first recycle stream in line 248 may be less than about 320 kPa, less than about 315 kPa, less than about 310 kPa, less than about 305 kPa, less than about 300 kPa, less than about 295 kPa, or less than about 290 kPa. In an exemplary embodiment, the pressure of the first recycle stream in line 248 may be about 297 kPa.

In at least one embodiment, compressing the first recycle stream in the compressor 164 may generate heat (e.g., the heat of compression) to thereby increase the temperature of the first recycle stream in line 248. For example, the first recycle stream in line 248 may have a temperature from a low of about 2° C., about 3° C., about 4° C., or about 5° C. to a high of about 7° C., about 8° C., about 9° C., about 10° C., or greater. In another example, the first recycle stream in line 248 may have a temperature from about 2° C. to about 10° C., about 3° C. to about 9° C., about 4° C. to about 8° C., or about 5° C. to about 7° C. In another example, the first recycle stream in line 248 may have a temperature greater than about 0° C., greater than about 1° C., greater than about 2° C., greater than about 3° C., or greater than about 4° C. In another example, the first recycle stream in line 248 may have a temperature less than about 10° C., less than about 9° C., less than about 8° C., less than about 7° C., less than about 6° C., or less than about 5° C. In an exemplary embodiment, the first recycle stream in line 248 may have a temperature of about 6° C.

In at least one embodiment, the compressor 164 may be configured to compress the first recycle stream to a selected inlet pressure of one or more compressor stages 114, 116, 118, 120 of the compression assembly 104. For example, as illustrated in FIG. 1, the compressor 164 may be fluidly coupled with the third compressor stage 118 via line 248 and configured to compress the first recycle stream to the selected inlet pressure of the third compressor stage 118. In at least one embodiment, the selected inlet pressure of the compressor stages 114, 116, 118, 120 may be determined by the operating parameters of the compressor 112. The third compressor stage 118 may compress the first recycle stream from line 248 and direct the compressed first recycle stream to the third cooler 136 via line 250. The first recycle stream may be cooled in the third cooler 136 and subsequently combined with the process stream in line 214 via line 216, as discussed above.

In at least one embodiment, the third compressor stage 118 may compress the first recycle stream to a pressure from a low of about 940 kPa, about 945 kPa, about 950 kPa, about 955 kPa, or about 960 kPa to a high of about 970 kPa, about 979 kPa, about 980 kPa, about 985 kPa, about 990 kPa, or greater. For example, the pressure of the first recycle stream in line 250 may be from about 940 kPa to about 990 kPa, about 945 kPa to about 985 kPa, about 950 kPa to about 980 kPa, about 955 kPa to about 975 kPa, or about 960 kPa to about 970 kPa. In another example, the pressure of the first recycle stream in line 250 may be greater than about 940 kPa, greater than about 950 kPa, greater than about 955 kPa, greater than about 960 kPa, or greater than about 965 kPa. In another example, the pressure of the first recycle stream in line 250 may be less than about 1,000 kPa, less than about 995 kPa, less than about 990 kPa, less than about 985 kPa, less than about 980 kPa, less than about 975 kPa, or less than about 970 kPa. In an exemplary embodiment, the pressure of the first recycle stream in line 250 may be about 965 kPa.

In at least one embodiment, compressing the first recycle stream in the third compressor stage 118 may generate heat (e.g., the heat of compression) to thereby increase the temperature of the first recycle stream in line 250. For example, the first recycle stream in line 250 may have a temperature from a low of about 65° C., about 70° C., about 75° C., or about 80° C. to a high of about 85° C., about 90° C., about 95° C., about 100° C., or greater. In another example, the first recycle stream in line 250 may have a temperature from about 65° C. to about 100° C., about 70° C. to about 95° C., about 75° C. to about 90° C., or about 80° C. to about 85° C. In another example, the first recycle stream in line 250 may have a temperature greater than about 65° C., greater than about 70° C., greater than about 75° C., greater than about 80° C., or greater than about 85° C. In another example, the first recycle stream in line 250 may have a temperature less than about 105° C., less than about 100° C., less than about 95° C., less than about 90° C., or less than about 85° C. In an exemplary embodiment, the first recycle stream in line 250 may have a temperature of about 83° C.

As previously discussed, at least a portion of the process stream from the third heat exchanger 154 may be directed to the expansion valve 160 to generate the second refrigeration stream. For example, as illustrated in FIG. 1, a portion of the process stream from the third heat exchanger 154 may be directed to the expansion valve 160 via line 252 to generate the second refrigeration stream. The expansion valve 160 may expand the portion of the process stream from the third heat exchanger 154 to decrease the temperature and pressure of the process stream and thereby generate the second refrigeration stream in line 254. In at least one embodiment, expanding the portion of the process stream through the expansion valve 160 may flash the process stream into a two-phase fluid including a vapor phase and a liquid phase. Accordingly, the second refrigeration stream in line 254 may include a liquid phase (e.g., about 70% or more) and a vapor phase (e.g., about 30% or less).

In at least one embodiment, the second refrigeration stream in line 254 may have a temperature from a low of about −175° C., about −170° C., about −165° C., or about −160° C. to a high of about −155° C., about −150° C., about −145° C., about −140° C., or greater. For example, the second refrigeration stream in line 254 may have a temperature from about −175° C. to about −140° C., about −170° C. to about −145° C., about −165° C. to about −150° C., or about −160° C. to about −155° C. In another example, the second refrigeration stream in line 254 may have a temperature greater than about −175° C., greater than about −170° C., greater than about −165° C., greater than about −160° C., or greater than about −155° C. In another example, the second refrigeration stream in line 254 may have a temperature less than about −130° C., less than about −135° C., less than about −140° C., less than about −145° C., less than about −150° C., or less than about −155° C. In an exemplary embodiment, the second refrigeration stream in line 254 may have a temperature of about −158° C.

In at least one embodiment, the second refrigeration stream in line 254 may have a pressure from a low of about 10 kPa, about 12 kPa, about 14 kPa, about 16 kPa, or about 18 kPa to a high of about 22 kPa, about 24 kPa, about 26 kPa, about 28 kPa, about 30 kPa, or greater. In another example, the pressure of the second refrigeration stream in line 254 may be from about 10 kPa to about 30 kPa, about 12 kPa to about 28 kPa, about 14 kPa to about 26 kPa, about 16 kPa to about 24 kPa, or about 18 kPa to about 22 kPa. In another example, the pressure of the second refrigeration stream in line 254 may be greater than about 10 kPa, greater than about 12 kPa, greater than about 14 kPa, greater than about 16 kPa, greater than about 18 kPa, greater than about 20 kPa, or greater than about 22 kPa. In another example, the pressure of the second refrigeration stream in line 254 may be less than about 32 kPa, less than about 30 kPa, less than about 28 kPa, less than about 26 kPa, less than about 24 kPa, or less than about 22 kPa. In an exemplary embodiment, the pressure of the second refrigeration stream in line 254 may be about 20 kPa.

In at least one embodiment, the second refrigeration stream may be directed to any one or more of the heat exchangers 150, 152, 154, 156 of the liquefaction assembly 108 to cool the process fluid flowing therethrough. For example, as previously discussed, the second refrigeration stream may be directed to the fourth heat exchanger 156 via line 254 to cool the process stream flowing therethrough. As previously discussed, the second refrigeration stream may sufficiently cool the process stream flowing through the fourth heat exchanger 156 to the subcritical state to thereby produce the LNG.

In at least one embodiment, cooling the process stream in the fourth heat exchanger 156 may not increase or substantially increase the temperature of the second refrigeration stream flowing therethrough. For example, as previously discussed, the second refrigeration stream in line 254 may be a two-phase fluid including the liquid phase and the vapor phase, and the heat or thermal energy absorbed by the second refrigeration stream may serve to vaporize the liquid phase. Accordingly, the liquid portion of the second refrigeration stream in line 254 may prevent or substantially prevent the heat absorbed from the process stream from reducing the temperature of the second refrigeration stream flowing through the fourth heat exchanger 156. As such, the second refrigeration stream in line 256 may have a temperature equal to or substantially equal to the second refrigeration stream in line 254. For example, the second refrigeration stream in line 256 may have a temperature from a low of about −175° C., about −170° C., about −165° C., or about −160° C. to a high of about −155° C., about −150° C., about −145° C., about −140° C., or greater. In another example, the second refrigeration stream in line 256 may have a temperature from about −175° C. to about −140° C., about −170° C. to about −145° C., about −165° C. to about −150° C., or about −160° C. to about −155° C. In another example, the second refrigeration stream in line 256 may have a temperature greater than about −175° C., greater than about −170° C., greater than about −165° C., greater than about −160° C., or greater than about −155° C. In another example, the second refrigeration stream in line 256 may have a temperature less than about −130° C., less than about −135° C., less than about −140° C., less than about −145° C., less than about −150° C., or less than about −155° C. In an exemplary embodiment, the second refrigeration stream in line 256 may have a temperature of about −158° C.

In at least one embodiment, the pressure of the second refrigeration stream in line 256 may also be substantially equal to the pressure of the second refrigeration stream in line 254. For example the second refrigeration stream in line 256 may have a pressure from a low of about 10 kPa, about 12 kPa, about 14 kPa, about 16 kPa, or about 18 kPa to a high of about 22 kPa, about 24 kPa, about 26 kPa, about 28 kPa, about 30 kPa, or greater. In another example, the pressure of the second refrigeration stream in line 256 may be from about 10 kPa to about 30 kPa, about 12 kPa to about 28 kPa, about 14 kPa to about 26 kPa, about 16 kPa to about 24 kPa, or about 18 kPa to about 22 kPa. In another example, the pressure of the second refrigeration stream in line 256 may be greater than about 10 kPa, greater than about 12 kPa, greater than about 14 kPa, greater than about 16 kPa, greater than about 18 kPa, greater than about 20 kPa, or greater than about 22 kPa. In another example, the pressure of the second refrigeration stream in line 256 may be less than about 32 kPa, less than about 30 kPa, less than about 28 kPa, less than about 26 kPa, less than about 24 kPa, or less than about 22 kPa. In an exemplary embodiment, the pressure of the second refrigeration stream in line 256 may be about 17 kPa.

In at least one embodiment, the second refrigeration stream from the fourth heat exchanger 156 may provide additional cooling to one or more of the remaining heat exchangers 150, 152, 154. For example, as illustrated in FIG. 1, the second refrigeration stream from the fourth heat exchanger 156 may be directed to the first heat exchanger 150 via line 256 to cool the process stream flowing therethrough. In at least one embodiment, the second refrigeration stream may be heated in the first heat exchanger 150 to a temperature from a low of about −45° C., about −40° C., about −35° C., or about −30° C. to a high of about −25° C., about −20° C., about −15° C., about −10° C., or greater. For example, the second refrigeration stream in line 258 may have a temperature from about −45° C. to about −10° C., about −40° C. to about −15° C., about −35° C. to about −20° C., or about −30° C. to about −25° C. In another example, the second refrigeration stream in line 258 may have a temperature greater than about −45° C., greater than about −40° C., greater than about −35° C., greater than about −30° C., or greater than about −25° C. In another example, the second refrigeration stream in line 258 may have a temperature less than about −5° C., less than about −10° C., less than about −15° C., less than about −20° C., or less than about −25° C. In an exemplary embodiment, the second refrigeration stream in line 258 may have a temperature of about −27° C.

In at least one embodiment, the pressure of the second refrigeration stream in line 258 may be substantially equal to the pressure of the second refrigeration stream in line 256. For example, the second refrigeration stream in line 258 may have a pressure from a low of about 4 kPa, about 6 kPa, about 8 kPa, about 10 kPa, or about 12 kPa to a high of about 16 kPa, about 18 kPa, about 20 kPa, about 22 kPa, about 24 kPa, or greater. In another example, the pressure of the second refrigeration stream in line 258 may be from about 4 kPa to about 24 kPa, about 6 kPa to about 22 kPa, about 8 kPa to about 20 kPa, about 10 kPa to about 18 kPa, or about 12 kPa to about 16 kPa. In another example, the pressure of the second refrigeration stream in line 258 may be greater than about 4 kPa, greater than about 6 kPa, greater than about 8 kPa, greater than about 10 kPa, greater than about 12 kPa, greater than about 14 kPa, or greater than about 16 kPa. In another example, the pressure of the second refrigeration stream in line 258 may be less than about 26 kPa, less than about 24 kPa, less than about 22 kPa, less than about 20 kPa, less than about 18 kPa, or less than about 16 kPa. In an exemplary embodiment, the pressure of the second refrigeration stream in line 258 may be about 14 kPa.

In at least one embodiment, the second refrigeration stream in line 258 may contain "clean" natural gas, and may be directed to the compression assembly 104 to provide the second recycle stream for the system 100. For example, the second refrigeration stream in line 258 may be directed to the compression assembly 104 as the second recycle stream and subsequently combined with the process stream flowing through the compression assembly 104. In at least one embodiment, the second recycle stream may be directed to one or more of the heat exchangers 142, 144, 146 of the cooling assembly 106 before being directed to the compression assembly 104. For example, as illustrated in FIG. 1, the second recycle stream may be directed to the third heat exchanger 146 of the cooling assembly 106 via line 258 to cool the process stream flowing therethrough. In at least one embodiment, cooling the process stream flowing through the third heat exchanger 146 with the second recycle stream may increase the efficiency of the compressor 112 and/or the compression assembly 104. For example, cooling the process stream may increase the density of the natural gas in the process stream and thereby decrease the energy or work that may be required to compress the process stream in the compressor 112. In at least one embodiment, the second recycle stream may cool the process stream in the third heat exchanger 146 to a temperature above the freezing point of water and/or $CO_2$ to thereby prevent the crystallization of the water and/or the $CO_2$ contained in the process stream.

In at least one embodiment, the third heat exchanger 146 may heat the second recycle stream to a temperature from a low of about 2° C., about 4° C., about 6° C., or about 8° C. to a high of about 10° C., about 12° C., about 14° C., about 16° C., or greater. For example, the second recycle stream in line 260 may have a temperature from about 2° C. to about 16° C., about 4° C. to about 14° C., about 6° C. to about 12° C., or about 8° C. to about 10° C. In another example, the second recycle stream in line 260 may have a temperature greater than about 0° C., greater than about 2° C., greater than about 4° C., greater than about 6° C., or greater than about 8° C. In another example, the second recycle stream in line 260 may have a temperature less than about 20° C., less than about 18° C., less than about 16° C., less than about 14° C., less than about 12° C., or less than about 10° C. In an exemplary embodiment, the second recycle stream in line 260 may have a temperature of about 9° C. In at least one embodiment, the second recycle stream in line 260 may have a pressure equal to or substantially equal to the pressure of the process stream in line 258. For example, the pressure of the second recycle stream in line 260 may be from about 4 kPa to about 24 kPa. In an exemplary embodiment, the pressure of the second recycle stream in line 260 may be about 7 kPa.

As illustrated in FIG. 1, the first compressor stage 114 may compress the second recycle stream from line 260 and direct the compressed second recycle stream to the first cooler 132 via line 262. In at least one embodiment, the first compressor stage 114 may compress the second recycle stream to a pressure from a low of about 210 kPa, about 220 kPa, about 225 kPa, about 230 kPa, or about 235 kPa to a high of about 245 kPa, about 250 kPa, about 255 kPa, about 260 kPa, about 270 kPa, or greater. For example, the pressure of the second recycle stream in line 262 may be from about 210 kPa to about 270 kPa, about 220 kPa to about 260 kPa, about 225 kPa to about 255 kPa, about 230 kPa to about 250 kPa, or about 235 kPa to about 245 kPa. In another example, the pressure of the second recycle stream in line 262 may be greater than about 210 kPa, greater than about 220 kPa, greater than about 225 kPa, greater than about 230 kPa, greater than about 235 kPa, greater than about 240 kPa, greater than about 245 kPa, greater than about 250 kPa, greater than about 255 kPa, or greater than about 260 kPa. In another example, the pressure of the second recycle stream in line 262 may be less than about 280 kPa, less than about 275 kPa, less than about 270 kPa, less than about 265 kPa, less than about 260 kPa, less than about 255 kPa, less than about 250 kPa, less than about 245 kPa, less than about 240 kPa, less than about 235 kPa, less than about 230 kPa, less than about 220 kPa, or less than about 210 kPa. In an exemplary embodiment, the pressure of the second recycle stream in line 262 may be about 240 kPa.

In at least one embodiment, compressing the second recycle stream in the first compressor stage 114 may generate heat (e.g., the heat of compression) to thereby increase the temperature of the second recycle stream in line 262. For example, the second recycle stream in line 262 may have a temperature from a low of about 75° C., about 80° C., about 85° C., or about 90° C. to a high of about 95° C., about 100° C., about 105° C., about 110° C., or greater. In another example, the second recycle stream in line 262 may have a temperature from about 75° C. to about 110° C., about 80° C. to about 105° C., about 85° C. to about 100° C., or about 90° C. to about 95° C. In another example, the second recycle stream in line 262 may have a temperature greater than about 75° C., greater than about 80° C., greater than about 85° C., greater than about 90° C., or greater than about 100° C. In another example, the second recycle stream in line 262 may have a temperature less than about 120° C., less than about 115° C., less than about 110° C., less than about 105° C., less than about 100° C., or less than about 95° C. In an exemplary embodiment, the second recycle stream in line 262 may have a temperature of about 93° C.

As illustrated in FIG. 1, the second recycle stream in line 262 may be cooled in the first cooler 132 and subsequently combined with the process stream in line 202 upstream of the separator 140 via line 204, as discussed above. In at least one embodiment, combining the second recycle stream with the process stream upstream of the separator 140 may reduce the amount of non-hydrocarbons (e.g., water and/or $CO_2$) to be removed by the separator 140. For example, at least a portion of the second recycle stream in line 204 may contain natural gas that has been "cleaned" in the separator 140, or "clean" natural gas, and the process stream in line 202, upstream of the separator 140, may contain natural gas from the natural gas source 102 that may not have been "cleaned" in the separator 140. As such, the second recycle stream in line 204 may have a relatively lower concentration of water and/or $CO_2$ than the process stream in line 202. Accordingly, combining the second recycle stream in line 204 with the process stream in line 202 may decrease the concentration of the non-hydrocarbons in the process stream directed to the separator 140 and thereby reduce the amount of water and/or $CO_2$ to be removed by the separator 140. In at least one embodiment, reducing the amount of water and/or $CO_2$ to be removed by the separator 140 may decrease the frequency of regenerating the separator 140 and/or the adsorbent contained therein.

In at least one embodiment, the first refrigeration stream may not be combined or mixed with the second refrigeration stream in the liquefaction assembly 108 and/or one or more components thereof. For example, the first refrigeration stream and the second refrigeration stream may be directed to separate and distinct heat exchangers 150, 152, 154, 156 of the liquefaction assembly 108. As illustrated in FIG. 1, the first refrigeration stream from the turbo-expander 158 may be directed to the second and third heat exchangers 152, 154, and the second refrigeration stream from the expansion valve 160 may be directed to the first and fourth heat exchangers 150, 156.

Figure 2:
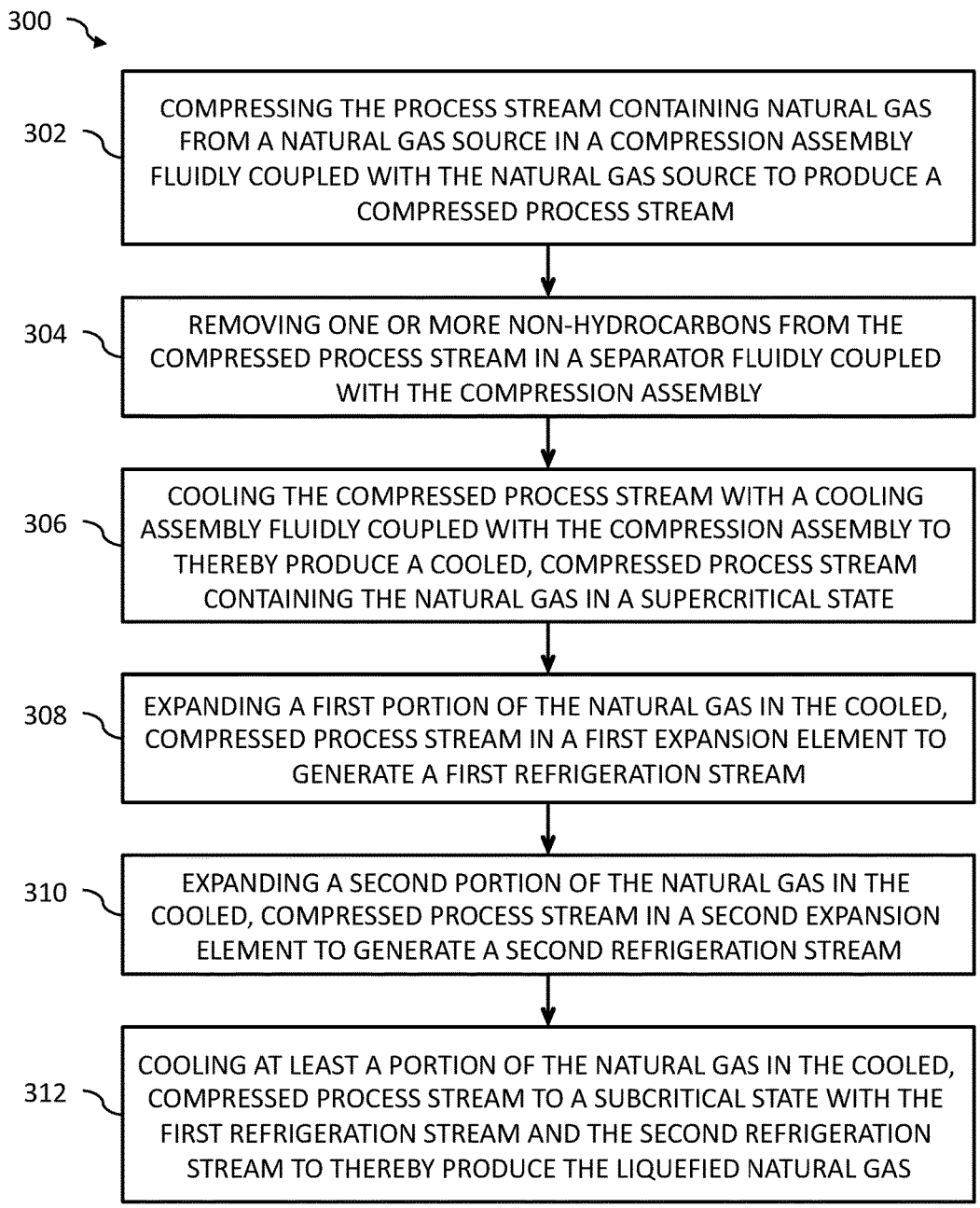
FIG. 2 illustrates a flowchart of a method for producing liquefied natural gas, according to one or more embodiments disclosed.

FIG. 2 illustrates a flowchart of a method 300 for producing liquefied natural gas, according to one or more embodiments. The method 300 may include compressing a process stream containing natural gas from a natural gas source in a compression assembly fluidly coupled with the natural gas source to produce a compressed process stream, as shown at 302. The method 300 may also include removing one or more non-hydrocarbons from the compressed process stream in a separator fluidly coupled with the compression assembly, as shown at 304. The method 300 may further include cooling the compressed process stream with a cooling assembly fluidly coupled with the compression assembly to thereby produce a cooled, compressed process stream containing the natural gas in a supercritical state, as shown at 306. The method 300 may also include expanding a first portion of the natural gas in the cooled, compressed process stream in a first expansion element to generate a first refrigeration stream, as shown at 308. The method 300 may also include expanding a second portion of the natural gas in the cooled, compressed process stream in a second expansion element to generate a second refrigeration stream, as shown at 310. The method 300 may also include cooling at least a portion of the natural gas in the cooled, compressed process stream to a subcritical state with the first refrigeration stream and the second refrigeration stream to thereby produce the liquefied natural gas, as shown at 312.

Figure 3:
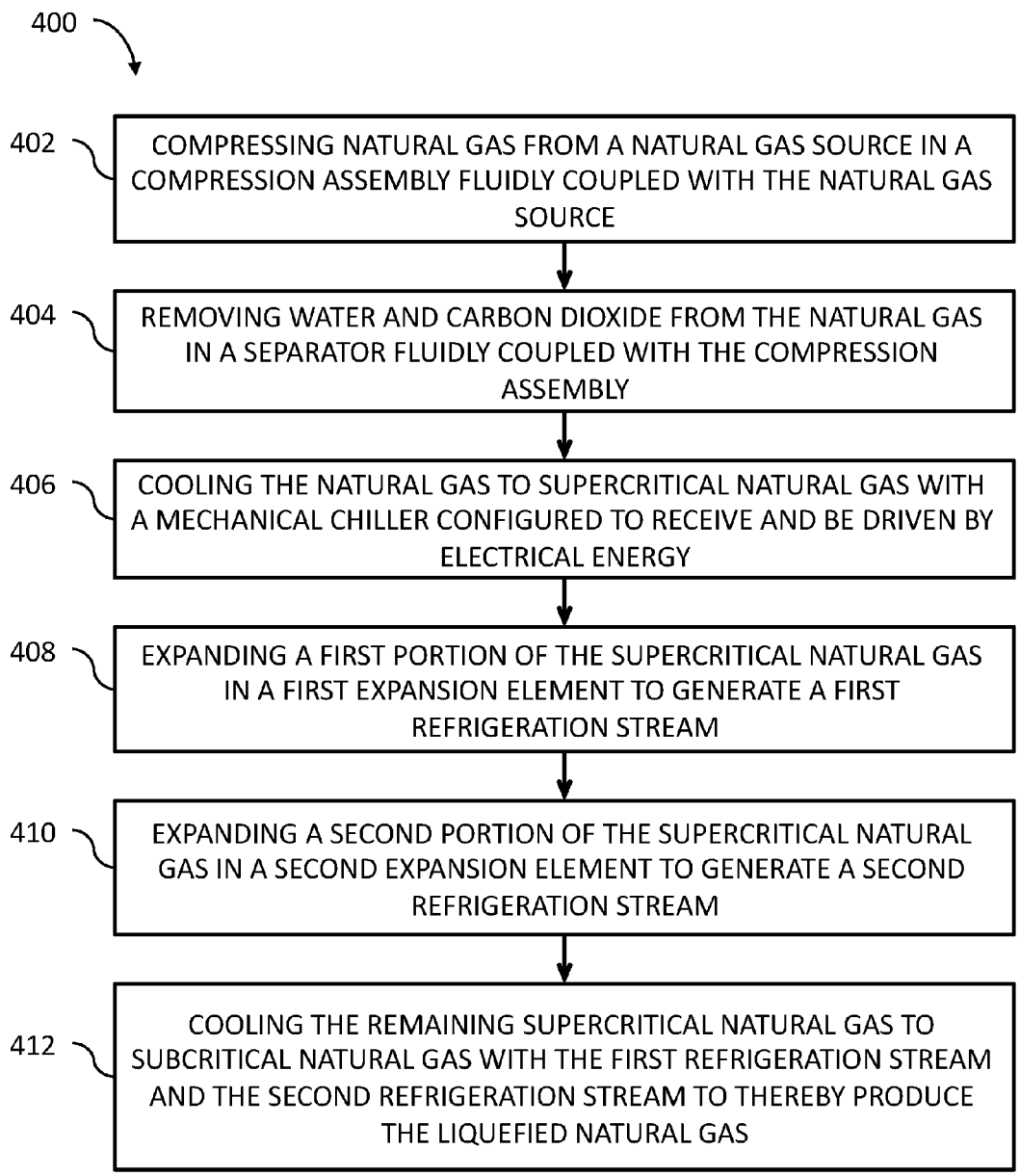
FIG. 3 illustrates a flowchart of another method for producing liquefied natural gas, according to one or more embodiments disclosed.

FIG. 3 illustrates a flowchart of another method 400 for producing liquefied natural gas, according to one or more embodiments. The method 400 may include compressing natural gas from a natural gas source in a compression assembly fluidly coupled with the natural gas source, as shown at 402. The method 400 may also include removing water and carbon dioxide from the natural gas in a separator fluidly coupled with the compression assembly, as shown at 404. The method 400 may further include cooling the natural gas to supercritical natural gas with a mechanical chiller configured to receive and be driven by electrical energy, as shown at 406. The method 400 may also include expanding a first portion of the supercritical natural gas in a first expansion element to generate a first refrigeration stream, as shown at 408. The method 400 may also include expanding a second portion of the supercritical natural gas in a second expansion element to generate a second refrigeration stream, as shown at 410. The method 400 may also include cooling the remaining supercritical natural gas to subcritical natural gas with the first refrigeration stream and the second refrigeration stream to thereby produce the liquefied natural gas, as shown at 412.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A method for producing liquefied natural gas, comprising:
   compressing a process stream containing natural gas from a natural gas source in a compression assembly fluidly coupled with the natural gas source to product a compressed process stream;

removing one or more non-hydrocarbons from the compressed process stream in a separator fluidly coupled with the compression assembly;

cooling the compressed process stream with a cooling assembly fluidly coupled with the compression assembly, thereby producing a cooled, compressed process stream containing the natural gas in a supercritical state;

expanding a first portion of the natural gas in the cooled, compressed process stream in a first expansion element to generate a first refrigeration stream;

expanding a second portion of the natural gas in the cooled, compressed process stream in a second expansion element to generate a second refrigeration stream;

cooling at least a portion of the natural gas in the cooled, compressed process stream to a subcritical state with the first refrigeration stream and the second stream, thereby producing the liquefied natural gas;

feeding the first refrigeration stream to the compression assembly as a first recycle stream; and combining the compressed first recycle stream with the compressed process stream downstream from the separator;

feeding the second refrigeration stream to the compression assembly as a second recycle stream; and combining the compressed second recycle stream with the process stream upstream of the separator.

2. The method of claim 1, wherein the second expansion element is an expansion valve.

3. The method of claim 1, wherein the first expansion element is a turbo-expander.

4. The method of claim 3, further comprising:

expanding the first portion of the cooled, compressed process stream in the turbo-expander to generate mechanical energy; and driving a compressor coupled with the turbo-expander with the mechanical energy to compress the first recycle stream.

5. The method of claim 1, wherein cooling the at least a portion of the natural gas in the cooled, compressed process stream to the subcritical state with the first refrigeration stream and the second refrigeration stream comprises:

cooling the at least a portion of the natural gas in the cooled, compressed process stream in a first heat exchanger with the first refrigeration stream; and cooling the at least a portion of the natural gas in the cooled, compressed process stream in a second heat exchanger with the second refrigeration stream.

6. The method of claim 1, wherein the cooling assembly includes a mechanical chiller configured to receive and be driven by electrical energy.

7. The method of claim 1, wherein compressing the process stream in the compression assembly comprises:

generating heat from the compression of the process stream; and absorbing at least a portion of the heat generated from the compression of the process stream with a cooler of the compression assembly.

8. The method of claim 1, wherein removing the one or more non-hydrocarbons from the compressed process stream in the separator comprises removing water and carbon dioxide from the natural gas in the separator at a pressure greater than about 1,000 kPa.

9. A method for producing liquefied natural gas, comprising:

compressing natural gas from a natural gas source in a compression assembly fluidly coupled with the natural gas source;

removing water and carbon dioxide from the natural gas in a separator fluidly coupled with the compression assembly;

cooling the natural gas to supercritical natural gas with a mechanical chiller configured to receive and be drive by electrical energy;

expanding a first portion of the supercritical natural gas in a first expansion element to generate a first refrigeration stream;

expanding a second portion of the supercritical natural gas in a second expansion element to generate a second refrigeration stream; and cooling the remaining supercritical natural gas to subcritical natural gas with the first refrigeration stream and the second refrigeration stream, thereby producing the liquefied natural gas;

feeding the first refrigeration stream to the compression assembly as a first recycle stream;

combining the compressed first recycle stream with the natural gas downstream from the separator;

feeding the second refrigeration stream to the compression assembly as a second recycle stream; and combining the compressed second recycle stream with the natural gas upstream of the separator.

10. The method of claim 9, wherein the first expansion element is a turbo-expander, and the second expansion element is an expansion valve.

11. The method of claim 9, further comprising removing water and carbon dioxide from the natural gas in the separator at a pressure greater than about 1,000 kPa.

12. The method of claim 9, further comprising:

combusting a portion of the natural gas from the natural gas source in an internal combustion engine to produce mechanical energy;

generating the electrical energy in a generator operatively coupled with the internal combustion engine; and directing at least a portion of the electrical energy to the mechanical chiller.

13. The method of claim 9, wherein cooling the remaining supercritical natural gas to the subcritical natural gas with the first refrigeration stream and the second refrigeration stream comprises:

cooling the remaining supercritical natural gas with the first refrigeration stream in a first heat exchanger; and cooling the remaining supercritical natural gas with the second refrigeration stream in a second heat exchanger.

* * * * *